(12) United States Patent
Noyes

(10) Patent No.: US 9,221,685 B2
(45) Date of Patent: Dec. 29, 2015

(54) METHODS OF CAPTURING AND SEQUESTERING CARBON

(71) Applicant: Seerstone LLC, Provo, UT (US)

(72) Inventor: Dallas B. Noyes, Provo, UT (US)

(73) Assignee: Seerstone LLC, Provo, UT (US)

( * ) Notice: Subject to any disclaimer, the term of this patent is extended or adjusted under 35 U.S.C. 154(b) by 0 days.

(21) Appl. No.: 14/389,715

(22) PCT Filed: Mar. 15, 2013

(86) PCT No.: PCT/US2013/000081
§ 371 (c)(1),
(2) Date: Sep. 30, 2014

(87) PCT Pub. No.: WO2013/158161
PCT Pub. Date: Oct. 24, 2013

(65) Prior Publication Data
US 2015/0078982 A1    Mar. 19, 2015

(51) Int. Cl.
*C01B 31/02* (2006.01)
*B01J 23/745* (2006.01)
(Continued)

(52) U.S. Cl.
CPC .......... *C01B 31/0233* (2013.01); *B01D 53/864* (2013.01); *B01J 23/745* (2013.01); *C01B 31/02* (2013.01); *C01B 31/0213* (2013.01); *C01B 31/0226* (2013.01); *C01B 31/04* (2013.01); *C01B 31/0446* (2013.01);
(Continued)

(58) Field of Classification Search
CPC ........... C01B 31/02; C01B 31/04; D01F 9/12; B82Y 40/00; B01J 23/755; B82B 1/00; B82B 3/00
See application file for complete search history.

(56) References Cited

U.S. PATENT DOCUMENTS 1,478,730 A    12/1923    Brownlee
1,735,925 A    11/1929    Jaeger
(Continued)

FOREIGN PATENT DOCUMENTS

EP    0945402 A1    9/1999
EP    2186931 A1    5/2010
(Continued)

OTHER PUBLICATIONS

PCT International Preliminary Report on Patentability, PCT/US2013/000081 dated Oct. 30, 2014.
(Continued)

*Primary Examiner* — Richard M Rump
(74) *Attorney, Agent, or Firm* — TraskBritt, P.C.

(57) ABSTRACT

Methods of capturing or sequestering carbon include introducing a reaction gas stream to a catalytic converter to convert a portion of the carbon in the carbon oxide to solid carbon and a tail gas stream containing water vapor, removing the solid carbon from the catalytic converter for use, disposal, or storage, and recycling at least a portion of the tail gas stream to the catalytic converter. Methods may also include removing a portion of the water from the tail gas stream. The tail gas stream includes a portion of the initial process gas stream and at least a portion of water vapor produced in the catalytic converter. Methods may also include removing water vapor from various streams and reacting the carbon oxide with a reducing agent in the presence of a catalyst. Systems for capturing or sequestering carbon from a gaseous source containing carbon oxides are also described.

19 Claims, 4 Drawing Sheets

(51) Int. Cl.
  *B01D 53/86* (2006.01)
  *C01B 31/04* (2006.01)
  *C01B 31/06* (2006.01)
  *B82Y 30/00* (2011.01)

(52) U.S. Cl.
  CPC .......... *C01B 31/06* (2013.01); *B01D 2257/502* (2013.01); *B01D 2257/504* (2013.01); *B82Y 30/00* (2013.01); *C01B 2202/02* (2013.01)

(56) References Cited

U.S. PATENT DOCUMENTS

| | | |
|---|---|---|
| 1,746,464 A | 2/1930 | Fischer et al. |
| 1,964,744 A | 7/1934 | Odell |
| 2,404,869 A | 7/1946 | Sorrentino |
| 2,429,980 A | 11/1947 | Allinson |
| 2,440,424 A | 4/1948 | Wiegand et al. |
| 2,745,973 A | 5/1956 | Rappaport |
| 2,796,331 A | 6/1957 | Kauffman et al. |
| 2,800,616 A | 7/1957 | Becker |
| 2,811,653 A | 10/1957 | Moore |
| 2,819,414 A | 1/1958 | Sherwood et al. |
| 2,837,666 A | 6/1958 | Linder |
| 2,976,433 A | 3/1961 | Rappaport et al. |
| 3,094,634 A | 6/1963 | Rappaport |
| 3,172,774 A | 3/1965 | Diefendorf |
| 3,249,830 A | 5/1966 | Adany |
| 3,378,345 A | 4/1968 | Bourdeau |
| 3,634,999 A | 1/1972 | Howard et al. |
| 3,714,474 A | 1/1973 | Hoff |
| 3,846,478 A | 11/1974 | Cummins |
| 3,905,748 A | 9/1975 | Cairo et al. |
| 4,024,420 A | 5/1977 | Anthony et al. |
| 4,126,000 A | 11/1978 | Funk |
| 4,197,281 A | 4/1980 | Muenger |
| 4,200,554 A | 4/1980 | Lauder |
| 4,602,477 A | 7/1986 | Lucadamo et al. |
| 4,628,143 A | 12/1986 | Brotz |
| 4,663,230 A | 5/1987 | Tennet |
| 4,710,483 A | 12/1987 | Burk et al. |
| 4,725,346 A | 2/1988 | Joshi |
| 4,727,207 A | 2/1988 | Paparizos et al. |
| 4,746,458 A | 5/1988 | Brotz |
| 4,900,368 A | 2/1990 | Brotz |
| 5,008,579 A | 4/1991 | Conley et al. |
| 5,021,139 A | 6/1991 | Hartig et al. |
| 5,082,505 A | 1/1992 | Cota et al. |
| 5,122,332 A | 6/1992 | Russell |
| 5,133,190 A | 7/1992 | Abdelmalek |
| 5,149,584 A | 9/1992 | Baker et al. |
| 5,187,030 A | 2/1993 | Firmin et al. |
| 5,260,621 A | 11/1993 | Little et al. |
| 5,396,141 A | 3/1995 | Jantz |
| 5,413,866 A | 5/1995 | Baker et al. |
| 5,456,897 A | 10/1995 | Moy et al. |
| 5,526,374 A | 6/1996 | Uebber |
| 5,531,424 A | 7/1996 | Whipp |
| 5,569,635 A | 10/1996 | Moy et al. |
| 5,572,544 A | 11/1996 | Mathur et al. |
| 5,578,543 A | 11/1996 | Tennent et al. |
| 5,589,152 A | 12/1996 | Tennent et al. |
| 5,624,542 A | 4/1997 | Shen et al. |
| 5,641,466 A | 6/1997 | Ebbesen et al. |
| 5,648,056 A | 7/1997 | Tanaka |
| 5,650,370 A | 7/1997 | Tennent et al. |
| 5,691,054 A | 11/1997 | Tennent et al. |
| 5,707,916 A | 1/1998 | Snyder et al. |
| 5,726,116 A | 3/1998 | Moy et al. |
| 5,747,161 A | 5/1998 | Iijima |
| 5,780,101 A | 7/1998 | Nolan et al. |
| 5,859,484 A | 1/1999 | Mannik et al. |
| 5,877,110 A | 3/1999 | Snyder et al. |
| 5,910,238 A | 6/1999 | Cable et al. |
| 5,965,267 A | 10/1999 | Nolan et al. |
| 5,997,832 A | 12/1999 | Lieber et al. |
| 6,099,965 A | 8/2000 | Tennent et al. |
| 6,159,892 A | 12/2000 | Moy et al. |
| 6,183,714 B1 | 2/2001 | Smalley et al. |
| 6,203,814 B1 | 3/2001 | Fisher et al. |
| 6,221,330 B1 | 4/2001 | Moy et al. |
| 6,232,706 B1 | 5/2001 | Dai et al. |
| 6,239,057 B1 | 5/2001 | Ichikawa et al. |
| 6,261,532 B1 | 7/2001 | Ono |
| 6,262,129 B1 | 7/2001 | Murray et al. |
| 6,294,144 B1 | 9/2001 | Moy et al. |
| 6,333,016 B1 | 12/2001 | Resasco et al. |
| 6,346,189 B1 | 2/2002 | Dai et al. |
| 6,361,861 B2 | 3/2002 | Gao |
| 6,375,917 B1 | 4/2002 | Mandeville et al. |
| 6,413,487 B1 | 7/2002 | Resasco et al. |
| 6,423,288 B2 | 7/2002 | Mandeville et al. |
| 6,426,442 B1 | 7/2002 | Ichikawa et al. |
| 6,465,813 B2 | 10/2002 | Ihm |
| 6,518,218 B1 | 2/2003 | Sun et al. |
| 6,596,101 B2 | 7/2003 | Weihs et al. |
| 6,645,455 B2 | 11/2003 | Margrave et al. |
| 6,683,783 B1 | 1/2004 | Smalley et al. |
| 6,686,311 B2 | 2/2004 | Sun et al. |
| 6,692,717 B1 | 2/2004 | Smalley et al. |
| 6,713,519 B2 | 3/2004 | Wang et al. |
| 6,749,827 B2 | 6/2004 | Smalley et al. |
| 6,761,870 B1 | 7/2004 | Smalley et al. |
| 6,790,425 B1 | 9/2004 | Smalley et al. |
| 6,800,369 B2 | 10/2004 | Gimzewski et al. |
| 6,827,918 B2 | 12/2004 | Margrave et al. |
| 6,827,919 B1 | 12/2004 | Moy et al. |
| 6,835,330 B2 | 12/2004 | Nishino et al. |
| 6,835,366 B1 | 12/2004 | Margrave et al. |
| 6,841,139 B2 | 1/2005 | Margrave et al. |
| 6,843,843 B2 | 1/2005 | Takahashi et al. |
| 6,855,301 B1 | 2/2005 | Rich et al. |
| 6,855,593 B2 | 2/2005 | Andoh |
| 6,875,412 B2 | 4/2005 | Margrave et al. |
| 6,890,986 B2 | 5/2005 | Pruett |
| 6,899,945 B2 | 5/2005 | Smalley et al. |
| 6,905,544 B2 | 6/2005 | Setoguchi et al. |
| 6,913,740 B2 | 7/2005 | Polverejan et al. |
| 6,913,789 B2 | 7/2005 | Smalley et al. |
| 6,916,434 B2 | 7/2005 | Nishino et al. |
| 6,919,064 B2 | 7/2005 | Resasco et al. |
| 6,936,233 B2 | 8/2005 | Smalley et al. |
| 6,949,237 B2 | 9/2005 | Smalley et al. |
| 6,955,800 B2 | 10/2005 | Resasco et al. |
| 6,960,389 B2 | 11/2005 | Tennent et al. |
| 6,962,685 B2 | 11/2005 | Sun |
| 6,979,709 B2 | 12/2005 | Smalley et al. |
| 6,986,876 B2 | 1/2006 | Smalley et al. |
| 6,998,358 B2 | 2/2006 | French et al. |
| 7,011,771 B2 | 3/2006 | Gao et al. |
| 7,041,620 B2 | 5/2006 | Smalley et al. |
| 7,045,108 B2 | 5/2006 | Jiang et al. |
| 7,048,999 B2 | 5/2006 | Smalley et al. |
| 7,052,668 B2 | 5/2006 | Smalley et al. |
| 7,067,098 B2 | 6/2006 | Colbert et al. |
| 7,071,406 B2 | 7/2006 | Smalley et al. |
| 7,074,379 B2 | 7/2006 | Moy et al. |
| 7,094,385 B2 | 8/2006 | Beguin et al. |
| 7,094,386 B2 | 8/2006 | Resasco et al. |
| 7,094,679 B1 | 8/2006 | Li et al. |
| 7,097,820 B2 | 8/2006 | Colbert et al. |
| 7,105,596 B2 | 9/2006 | Smalley et al. |
| 7,125,534 B1 | 10/2006 | Smalley et al. |
| 7,132,062 B1 | 11/2006 | Howard |
| 7,135,159 B2 | 11/2006 | Shaffer et al. |
| 7,135,160 B2 | 11/2006 | Yang et al. |
| 7,150,864 B1 | 12/2006 | Smalley et al. |
| 7,157,068 B2 | 1/2007 | Li et al. |
| 7,160,532 B2 | 1/2007 | Liu et al. |
| 7,169,329 B2 | 1/2007 | Wong et al. |
| 7,201,887 B2 | 4/2007 | Smalley et al. |
| 7,204,970 B2 | 4/2007 | Smalley et al. |
| 7,205,069 B2 | 4/2007 | Smalley et al. |
| 7,212,147 B2 | 5/2007 | Messano |
| 7,214,360 B2 | 5/2007 | Chen et al. |

(56) References Cited

U.S. PATENT DOCUMENTS

| | | |
|---|---|---|
| 7,250,148 B2 | 7/2007 | Yang et al. |
| 7,270,795 B2 | 9/2007 | Kawakami et al. |
| 7,291,318 B2 | 11/2007 | Sakurabayashi et al. |
| 7,338,648 B2 | 3/2008 | Harutyunyan et al. |
| 7,365,289 B2 | 4/2008 | Wilkes et al. |
| 7,374,793 B2 | 5/2008 | Furukawa et al. |
| 7,390,477 B2 | 6/2008 | Smalley et al. |
| 7,396,798 B2 | 7/2008 | Ma et al. |
| 7,408,186 B2 | 8/2008 | Merkulov et al. |
| 7,410,628 B2 | 8/2008 | Bening et al. |
| 7,413,723 B2 | 8/2008 | Niu et al. |
| 7,452,828 B2 | 11/2008 | Hirakata et al. |
| 7,459,137 B2 | 12/2008 | Tour et al. |
| 7,459,138 B2 | 12/2008 | Resasco et al. |
| 7,473,873 B2 | 1/2009 | Biris et al. |
| 7,510,695 B2 | 3/2009 | Smalley et al. |
| 7,527,780 B2 | 5/2009 | Margrave et al. |
| 7,563,427 B2 | 7/2009 | Wei et al. |
| 7,563,428 B2 | 7/2009 | Resasco et al. |
| 7,569,203 B2 | 8/2009 | Fridman et al. |
| 7,572,426 B2 | 8/2009 | Strano et al. |
| 7,585,483 B2 | 9/2009 | Edwin et al. |
| 7,601,322 B2 | 10/2009 | Huang |
| 7,611,579 B2 | 11/2009 | Lashmore et al. |
| 7,615,204 B2 | 11/2009 | Ajayan et al. |
| 7,618,599 B2 | 11/2009 | Kim et al. |
| 7,622,059 B2 | 11/2009 | Bordere et al. |
| 7,632,569 B2 | 12/2009 | Smalley et al. |
| 7,645,933 B2 | 1/2010 | Narkis et al. |
| 7,655,302 B2 | 2/2010 | Smalley et al. |
| 7,670,510 B2 | 3/2010 | Wong et al. |
| 7,700,065 B2 | 4/2010 | Fujioka et al. |
| 7,704,481 B2 | 4/2010 | Higashi et al. |
| 7,718,283 B2 | 5/2010 | Raffaelle et al. |
| 7,719,265 B2 | 5/2010 | Harutyunyan et al. |
| 7,731,930 B2 | 6/2010 | Taki et al. |
| 7,736,741 B2 | 6/2010 | Maruyama et al. |
| 7,740,825 B2 | 6/2010 | Tohji et al. |
| 7,749,477 B2 | 7/2010 | Jiang et al. |
| 7,754,182 B2 | 7/2010 | Jiang et al. |
| 7,772,447 B2 | 8/2010 | Iaccino et al. |
| 7,780,939 B2 | 8/2010 | Margrave et al. |
| 7,785,558 B2 | 8/2010 | Hikata |
| 7,790,228 B2 | 9/2010 | Suekane et al. |
| 7,794,690 B2 | 9/2010 | Abatzoglou et al. |
| 7,794,797 B2 | 9/2010 | Vasenkov |
| 7,799,246 B2 | 9/2010 | Bordere et al. |
| 7,811,542 B1 | 10/2010 | McElrath et al. |
| 7,824,648 B2 | 11/2010 | Jiang et al. |
| 7,837,968 B2 | 11/2010 | Chang et al. |
| 7,838,843 B2 | 11/2010 | Kawakami et al. |
| 7,842,271 B2 | 11/2010 | Petrik |
| 7,854,945 B2 | 12/2010 | Fischer et al. |
| 7,854,991 B2 | 12/2010 | Hata et al. |
| 7,858,648 B2 | 12/2010 | Bianco et al. |
| 7,871,591 B2 | 1/2011 | Harutyunyan et al. |
| 7,883,995 B2 | 2/2011 | Mitchell et al. |
| 7,887,774 B2 | 2/2011 | Strano et al. |
| 7,888,543 B2 | 2/2011 | Iaccino et al. |
| 7,897,209 B2 | 3/2011 | Shibuya et al. |
| 7,901,654 B2 | 3/2011 | Harutyunyan |
| 7,906,095 B2 | 3/2011 | Kawabata |
| 7,919,065 B2 | 4/2011 | Pedersen et al. |
| 7,923,403 B2 | 4/2011 | Ma et al. |
| 7,923,615 B2 | 4/2011 | Silvy et al. |
| 7,932,419 B2 | 4/2011 | Liu et al. |
| 7,947,245 B2 | 5/2011 | Tada et al. |
| 7,951,351 B2 | 5/2011 | Ma et al. |
| 7,964,174 B2 | 6/2011 | Dubin et al. |
| 7,981,396 B2 | 7/2011 | Harutyunyan |
| 7,988,861 B2 | 8/2011 | Pham-Huu et al. |
| 7,993,594 B2 | 8/2011 | Wei et al. |
| 8,012,447 B2 | 9/2011 | Harutyunyan et al. |
| 8,017,282 B2 | 9/2011 | Choi et al. |
| 8,017,892 B2 | 9/2011 | Biris et al. |
| 8,038,908 B2 | 10/2011 | Hirai et al. |
| 8,114,518 B2 | 2/2012 | Hata et al. |
| 8,138,384 B2 | 3/2012 | Iaccino et al. |
| 8,173,096 B2 | 5/2012 | Chang et al. |
| 8,178,049 B2 | 5/2012 | Shiraki et al. |
| 8,226,902 B2 | 7/2012 | Jang et al. |
| 8,314,044 B2 | 11/2012 | Jangbarwala |
| 2001/0009119 A1 | 7/2001 | Murray et al. |
| 2002/0054849 A1 | 5/2002 | Baker et al. |
| 2002/0102193 A1 | 8/2002 | Smalley et al. |
| 2002/0102196 A1 | 8/2002 | Smalley et al. |
| 2002/0127169 A1 | 9/2002 | Smalley et al. |
| 2002/0127170 A1 | 9/2002 | Hong et al. |
| 2002/0172767 A1 | 11/2002 | Grigorian et al. |
| 2003/0059364 A1 | 3/2003 | Prilutskiy |
| 2003/0147802 A1 | 8/2003 | Smalley et al. |
| 2004/0053440 A1 | 3/2004 | Lai et al. |
| 2004/0070009 A1 | 4/2004 | Resasco et al. |
| 2004/0105807 A1 | 6/2004 | Fan et al. |
| 2004/0111968 A1 | 6/2004 | Day et al. |
| 2004/0151654 A1 | 8/2004 | Wei et al. |
| 2004/0194705 A1 | 10/2004 | Dai et al. |
| 2004/0197260 A1 | 10/2004 | Resasco et al. |
| 2004/0202603 A1 | 10/2004 | Fischer et al. |
| 2004/0234445 A1 | 11/2004 | Serp et al. |
| 2004/0247503 A1 | 12/2004 | Hyeon |
| 2004/0265212 A1 | 12/2004 | Varadan et al. |
| 2005/0002850 A1 | 1/2005 | Niu et al. |
| 2005/0002851 A1 | 1/2005 | McElrath et al. |
| 2005/0025695 A1 | 2/2005 | Pradhan |
| 2005/0042162 A1 | 2/2005 | Resasco et al. |
| 2005/0046322 A1 | 3/2005 | Kim et al. |
| 2005/0074392 A1 | 4/2005 | Yang et al. |
| 2005/0079118 A1 | 4/2005 | Maruyama et al. |
| 2005/0100499 A1 | 5/2005 | Oya et al. |
| 2005/0176990 A1 | 8/2005 | Coleman et al. |
| 2005/0244325 A1 | 11/2005 | Nam et al. |
| 2005/0276743 A1 | 12/2005 | Lacombe et al. |
| 2006/0013757 A1 | 1/2006 | Edwin et al. |
| 2006/0032330 A1 | 2/2006 | Sato |
| 2006/0045837 A1 | 3/2006 | Nishimura |
| 2006/0078489 A1 | 4/2006 | Harutyunyan et al. |
| 2006/0104884 A1 | 5/2006 | Shaffer et al. |
| 2006/0104886 A1 | 5/2006 | Wilson |
| 2006/0104887 A1 | 5/2006 | Fujioka et al. |
| 2006/0133990 A1 | 6/2006 | Hyeon et al. |
| 2006/0141346 A1 | 6/2006 | Gordon et al. |
| 2006/0165988 A1 | 7/2006 | Chiang et al. |
| 2006/0191835 A1 | 8/2006 | Petrik et al. |
| 2006/0199770 A1 | 9/2006 | Bianco et al. |
| 2006/0204426 A1 | 9/2006 | Akins et al. |
| 2006/0225534 A1 | 10/2006 | Swihart et al. |
| 2006/0239890 A1 | 10/2006 | Chang et al. |
| 2006/0239891 A1 | 10/2006 | Niu et al. |
| 2006/0245996 A1 | 11/2006 | Xie et al. |
| 2006/0275956 A1 | 12/2006 | Konesky |
| 2007/0003470 A1 | 1/2007 | Smalley et al. |
| 2007/0020168 A1 | 1/2007 | Asmussen et al. |
| 2007/0031320 A1 | 2/2007 | Jiang et al. |
| 2007/0080605 A1 | 4/2007 | Chandrashekhar et al. |
| 2007/0116631 A1 | 5/2007 | Li et al. |
| 2007/0148962 A1 | 6/2007 | Kauppinen et al. |
| 2007/0149392 A1 | 6/2007 | Ku et al. |
| 2007/0183959 A1* | 8/2007 | Charlier et al. ............ 423/447.1 |
| 2007/0189953 A1 | 8/2007 | Bai et al. |
| 2007/0207318 A1 | 9/2007 | Jin et al. |
| 2007/0209093 A1 | 9/2007 | Tohji et al. |
| 2007/0253886 A1 | 11/2007 | Abatzoglou et al. |
| 2007/0264187 A1 | 11/2007 | Harutyunyan et al. |
| 2007/0280876 A1 | 12/2007 | Tour et al. |
| 2007/0281087 A1 | 12/2007 | Harutyunyan et al. |
| 2008/0003170 A1 | 1/2008 | Buchholz et al. |
| 2008/0003182 A1 | 1/2008 | Wilson et al. |
| 2008/0008760 A1 | 1/2008 | Bianco et al. |
| 2008/0014654 A1 | 1/2008 | Weisman et al. |
| 2008/0095695 A1 | 4/2008 | Shanov et al. |
| 2008/0118426 A1 | 5/2008 | Li et al. |
| 2008/0160312 A1 | 7/2008 | Furukawa et al. |
| 2008/0169061 A1 | 7/2008 | Tour et al. |

(56) References Cited

U.S. PATENT DOCUMENTS

| | | |
|---|---|---|
| 2008/0176069 A1 | 7/2008 | Ma et al. |
| 2008/0182155 A1 | 7/2008 | Choi et al. |
| 2008/0193367 A1 | 8/2008 | Kalck et al. |
| 2008/0217588 A1 | 9/2008 | Arnold et al. |
| 2008/0226538 A1 | 9/2008 | Rumpf et al. |
| 2008/0233402 A1 | 9/2008 | Carlson et al. |
| 2008/0260618 A1 | 10/2008 | Kawabata |
| 2008/0274277 A1 | 11/2008 | Rashidi et al. |
| 2008/0279753 A1 | 11/2008 | Harutyunyan |
| 2008/0280136 A1 | 11/2008 | Zachariah et al. |
| 2008/0296537 A1 | 12/2008 | Gordon et al. |
| 2008/0299029 A1 | 12/2008 | Grosboll et al. |
| 2008/0305028 A1 | 12/2008 | McKeigue et al. |
| 2008/0305029 A1 | 12/2008 | McKeigue et al. |
| 2008/0305030 A1 | 12/2008 | McKeigue et al. |
| 2008/0318357 A1 | 12/2008 | Raffaelle et al. |
| 2009/0001326 A1 | 1/2009 | Sato et al. |
| 2009/0004075 A1 | 1/2009 | Chung et al. |
| 2009/0011128 A1 | 1/2009 | Oshima et al. |
| 2009/0035569 A1 | 2/2009 | Gonzalez Moral et al. |
| 2009/0056802 A1 | 3/2009 | Rabani |
| 2009/0074634 A1 | 3/2009 | Tada et al. |
| 2009/0081454 A1 | 3/2009 | Axmann et al. |
| 2009/0087371 A1 | 4/2009 | Jang et al. |
| 2009/0087622 A1 | 4/2009 | Busnaina et al. |
| 2009/0124705 A1 | 5/2009 | Meyer et al. |
| 2009/0134363 A1 | 5/2009 | Bordere et al. |
| 2009/0136413 A1 | 5/2009 | Li et al. |
| 2009/0140215 A1 | 6/2009 | Buchholz et al. |
| 2009/0186223 A1 | 7/2009 | Saito et al. |
| 2009/0191352 A1 | 7/2009 | DuFaux et al. |
| 2009/0203519 A1 | 8/2009 | Abatzoglou et al. |
| 2009/0208388 A1 | 8/2009 | McKeigue et al. |
| 2009/0208708 A1 | 8/2009 | Wei et al. |
| 2009/0220392 A1 | 9/2009 | McKeigue et al. |
| 2009/0226704 A1 | 9/2009 | Kauppinen et al. |
| 2009/0257945 A1 | 10/2009 | Biris et al. |
| 2009/0286084 A1 | 11/2009 | Tennent et al. |
| 2009/0286675 A1 | 11/2009 | Wei et al. |
| 2009/0294753 A1 | 12/2009 | Hauge et al. |
| 2009/0297846 A1 | 12/2009 | Hata et al. |
| 2009/0297847 A1 | 12/2009 | Kim et al. |
| 2009/0301349 A1 | 12/2009 | Afzali-Ardakani et al. |
| 2010/0004468 A1 | 1/2010 | Wong et al. |
| 2010/0009204 A1 | 1/2010 | Noguchi et al. |
| 2010/0028735 A1 | 2/2010 | Basset et al. |
| 2010/0034725 A1 | 2/2010 | Harutyunyan |
| 2010/0062229 A1 | 3/2010 | Hata et al. |
| 2010/0065776 A1 | 3/2010 | Han et al. |
| 2010/0074811 A1 | 3/2010 | McKeigue et al. |
| 2010/0081568 A1 | 4/2010 | Bedworth |
| 2010/0104808 A1 | 4/2010 | Fan et al. |
| 2010/0129654 A1 | 5/2010 | Jiang et al. |
| 2010/0132259 A1 | 6/2010 | Haque |
| 2010/0132883 A1 | 6/2010 | Burke et al. |
| 2010/0150810 A1 | 6/2010 | Yoshida et al. |
| 2010/0158788 A1 | 6/2010 | Kim et al. |
| 2010/0159222 A1 | 6/2010 | Hata et al. |
| 2010/0160155 A1 | 6/2010 | Liang |
| 2010/0167053 A1 | 7/2010 | Sung et al. |
| 2010/0173037 A1 | 7/2010 | Jiang et al. |
| 2010/0173153 A1 | 7/2010 | Hata et al. |
| 2010/0196249 A1 | 8/2010 | Hata et al. |
| 2010/0196600 A1 | 8/2010 | Shibuya et al. |
| 2010/0209696 A1 | 8/2010 | Seals et al. |
| 2010/0213419 A1 | 8/2010 | Jiang et al. |
| 2010/0221173 A1 | 9/2010 | Tennent et al. |
| 2010/0222432 A1 | 9/2010 | Hua |
| 2010/0226848 A1 | 9/2010 | Nakayama et al. |
| 2010/0230642 A1 | 9/2010 | Kim et al. |
| 2010/0239489 A1 | 9/2010 | Harutyunyan et al. |
| 2010/0254860 A1 | 10/2010 | Shiraki et al. |
| 2010/0254886 A1 | 10/2010 | McElrath et al. |
| 2010/0260927 A1 | 10/2010 | Gordon et al. |
| 2010/0278717 A1 | 11/2010 | Suzuki et al. |
| 2010/0298125 A1 | 11/2010 | Kim et al. |
| 2010/0301278 A1 | 12/2010 | Hirai et al. |
| 2010/0303675 A1 | 12/2010 | Suekane et al. |
| 2010/0316556 A1 | 12/2010 | Wei et al. |
| 2010/0316562 A1 | 12/2010 | Carruthers et al. |
| 2010/0317790 A1 | 12/2010 | Jang et al. |
| 2010/0320437 A1 | 12/2010 | Gordon et al. |
| 2011/0008617 A1 | 1/2011 | Hata et al. |
| 2011/0014368 A1 | 1/2011 | Vasenkov |
| 2011/0020211 A1 | 1/2011 | Jayatissa |
| 2011/0024697 A1 | 2/2011 | Biris et al. |
| 2011/0027162 A1 | 2/2011 | Steiner, III et al. |
| 2011/0027163 A1 | 2/2011 | Shinohara et al. |
| 2011/0033367 A1 | 2/2011 | Riehl et al. |
| 2011/0039124 A1 | 2/2011 | Ikeuchi et al. |
| 2011/0053020 A1 | 3/2011 | Norton et al. |
| 2011/0053050 A1 | 3/2011 | Lim et al. |
| 2011/0060087 A1 | 3/2011 | Noguchi et al. |
| 2011/0085961 A1 | 4/2011 | Noda et al. |
| 2011/0110842 A1 | 5/2011 | Haddon |
| 2011/0117365 A1 | 5/2011 | Hata et al. |
| 2011/0120138 A1 | 5/2011 | Gaiffi et al. |
| 2011/0150746 A1 | 6/2011 | Khodadadi et al. |
| 2011/0155964 A1 | 6/2011 | Arnold et al. |
| 2011/0158892 A1 | 6/2011 | Yamaki |
| 2011/0171109 A1 | 7/2011 | Petrik |
| 2011/0174145 A1 | 7/2011 | Ogrin et al. |
| 2011/0206469 A1 | 8/2011 | Furuyama et al. |
| 2011/0298071 A9 | 12/2011 | Spencer et al. |
| 2012/0034150 A1 | 2/2012 | Noyes |
| 2012/0083408 A1 | 4/2012 | Sato et al. |
| 2012/0107610 A1 | 5/2012 | Moravsky et al. |
| 2012/0137664 A1 | 6/2012 | Shawabkeh et al. |
| 2012/0148476 A1 | 6/2012 | Hata et al. |
| 2013/0154438 A1 | 6/2013 | Tan Xing Haw |
| 2014/0021827 A1 | 1/2014 | Noyes |
| 2014/0141248 A1 | 5/2014 | Noyes |
| 2014/0348739 A1 | 11/2014 | Denton et al. |
| 2015/0059527 A1 | 3/2015 | Noyes |
| 2015/0059571 A1 | 3/2015 | Denton et al. |
| 2015/0064092 A1 | 3/2015 | Noyes |
| 2015/0064096 A1 | 3/2015 | Noyes |
| 2015/0064097 A1 | 3/2015 | Noyes |
| 2015/0071846 A1 | 3/2015 | Noyes |
| 2015/0071848 A1 | 3/2015 | Denton et al. |
| 2015/0078982 A1 | 3/2015 | Noyes |

FOREIGN PATENT DOCUMENTS

| | | |
|---|---|---|
| EP | 2404869 A1 | 1/2012 |
| KR | 1020050072056 A | 7/2005 |
| WO | 0230816 A1 | 4/2002 |
| WO | 03018474 A1 | 3/2003 |
| WO | 2004096704 A3 | 11/2005 |
| WO | 2005103348 A1 | 11/2005 |
| WO | 2006003482 A3 | 8/2006 |
| WO | 2007086909 A3 | 11/2007 |
| WO | 2007139097 A1 | 12/2007 |
| WO | 2007126412 A3 | 6/2008 |
| WO | 2009011984 A1 | 1/2009 |
| WO | 2006130150 A3 | 4/2009 |
| WO | 2009122139 A1 | 10/2009 |
| WO | 2009145959 A1 | 12/2009 |
| WO | 2010047439 A1 | 4/2010 |
| WO | 2010087903 A1 | 8/2010 |
| WO | 2010120581 A1 | 10/2010 |
| WO | 2011009071 A1 | 1/2011 |
| WO | 2011020568 A1 | 2/2011 |
| WO | 2011029144 A1 | 3/2011 |
| WO | 2010146169 A3 | 4/2011 |
| WO | 2010124258 A3 | 5/2011 |
| WO | 2011053192 A2 | 5/2011 |
| WO | 2013090274 | 6/2013 |
| WO | 2013158155 | 10/2013 |
| WO | 2013158155 A1 | 10/2013 |
| WO | 2013158156 | 10/2013 |
| WO | 2013158156 A1 | 10/2013 |
| WO | 2013158157 A1 | 10/2013 |
| WO | 2013158158 A1 | 10/2013 |

(56) References Cited

FOREIGN PATENT DOCUMENTS

| WO | 2013158159 | A1 | 10/2013 |
|---|---|---|---|
| WO | 2013158160 | A1 | 10/2013 |
| WO | 2013158161 | A1 | 10/2013 |
| WO | 2013158438 | | 10/2013 |
| WO | 2013158439 | | 10/2013 |
| WO | 2013158441 | | 10/2013 |
| WO | 2013162650 | A1 | 10/2013 |
| WO | 2014011206 | | 1/2014 |
| WO | 2014011206 | A1 | 1/2014 |
| WO | 2014011631 | | 1/2014 |
| WO | 2014011631 | A1 | 1/2014 |
| WO | 2014085378 | A1 | 6/2014 |

OTHER PUBLICATIONS

Abatzoglou, Nicolas et al., "The use of catalytic reforming reactions for C02 sequestration as carbon nanotubes," Proceedings of the 2006 IASME/WSEAS International Conference on Energy & Environmental Systems, Chalkida, Greece, May 8-10, 2006 (pp. 21-26) (available at: http://www.wseas.us/e-library/conferences/2006evia/papers/516-19 3.pdf).

Abatzoglou, Nicolas et al., "Green Diesel from Fischer-Tropsch Synthesis: Challenges and Hurdles," Proc. of the 3rd IASME/WSEAS Int. Conf. on Energy, Environment, Ecosystems and Sustainable Development, Agios Nikolaos, Greece, Jul. 24-26, 2007, pp. 223-232.

Baker, B. A. and G. D. Smith "Metal Dusting in a Laboratory Environment—Alloying Addition Effects," Special Metals Corporation, undated.

Baker, B. A. and G. D. Smith, "Alloy Solutions to Metal Dusting Problems in the PetroChemical Industry," Special Metals Corporation, undated.

Bogue, Robert, Powering Tomorrow's Sensor: A Review of Technologies—Part 1, Sensor Review, 2010, pp. 182-186, vol. 30, No. 3.

Cha, S. I., et al., "Mechanical and electrical properties of cross•linked carbon nanotubes," Carbon 46 (2008) 482-488, Elsevier, Ltd.

Cheng, H.M. et al., "Large-scale and low-cost synthesis of single-walled carbon nanotubes by the catalytic pyrolysis of hydrocarbons," Applied Physics Letters 72:3282-3284, Jun. 22, 1998 (available at: http://carbon.imr.ac.cn./file/journai/1998/98_APL_72_3282-ChengH M.pdf).

Chun, Changmin, and Ramanarayanan, Trikur A., "Metal Dusting Corrosion of Metals and Alloys," 2007.

Chung, U.C., and W.S. Chung, "Mechanism on Growth of Carbon Nanotubes Using CO-H2 Gas Mixture," Materials Science Forum vols. 475-479 (2005) pp. 3551-3554.

Dai, et al., "Single-wall nanotubes produced by metal-catalyzed disproportionation of carbon monoxide," Chemical Physics Letters 260 (1996) 471-475, Elsevier.

Dresselhaus et al., Carbon Nanotubes Synthesis, Structure, Properties, and Applications. 2001, pp. 1-9, Springer.

Garmirian, James Edwin, "Carbon Deposition in a Bosch Process Using a Cobalt and Nickel Catalyst," PhD Dissertation, Massachusetts Institute of Technology, Mar. 1980, pp. 14-185.

Grobert, Nicole, "Carbon nanotubes—becoming clean," Materials Today, vol. 10, No. 1-2, Jan.-Feb. 2007, Elsevier, pp. 28-35.

Hata, Kenji, "From Highly Efficient Impurity-Free CNT Synthesis to DWNT forests, CNTsolids and Super-Capacitors," unknown date, unknown publisher, Research Center for Advanced Carbon Materials, National Institute of Advanced Industrial Science and Technology (AIST), Tsukuba, 305-8565, Japan.

Hiraoka, Tatsuki, et al., "Synthesis of Single- and Double-Walled Carbon Nanotube Forests on Conducting Metal Foils," 9 J. Am. Chem. Soc. 2006, 128, 13338-13339.

Holmes, et al.; A Carbon Dioxide Reduction Unit Using Bosch Reaction and Expendable Catalyst Cartridges; NASA; 1970; available at https://archive.org/details/nasa_techdoc_19710002858.

Huang, Z.P., et al., "Growth of highly oriented carbon nanotubes by plasma-enhanced hot filament chemical vapor deposition," Applied Physics Letters 73:3845-3847, Dec. 28, 1998.

"INCONEL® alloy 693—Excellent Resistance to Metal Dusting and High Temperature Corrosion" Special Metals Product Sheet, 2005.

Kavetsky et al., Chapter 2, Radioactive Materials, Ionizing Radiation Sources, and Radioluminescent Light Sources for Nuclear Batteries, Polymers, Phosphors, and Voltaics for Radioisotope Microbatteries, Edited by Bower et al., 2002, pp. 39-59, CRC Press.

Krestinin, A. V., et al. "Kinetics of Growth of Carbon Fibers on an Iron Catalyst in Methane Pyrolysis: A Measurement Procedure with the Use of an Optical Microscope," Kinetics and Catalysis, 2008, vol. 49, No. 1, pp. 68-78.

Lal, Archit, "Effect of Gas Composition and Carbon Activity on the Growth of Carbon Nanotubes," Masters Thesis, University of Florida, 2003.

Manasse et al., Schottky Barrier Betavoltaic Battery, IEEE Transactions on Nuclear Science, vol. NS-23, No. 1, Feb. 1976, pp. 860-70.

Manning, Michael Patrick, "An Investigation of the Bosch Process," PhD Dissertation, Massachusetts Institute of Technology, Jan. 1976.

Unknown author, "Metal Dusting," unknown publisher, undated.

Unknown author, "Metal Dusting of reducing gas furnace HK40 tube," unknown publisher, undated.

Muller-Lorenz and Grabke, Coking by metal dusting of steels, 1999, Materials and Corrosion 50, 614-621 (1999).

Nasibulin, Albert G., et al., "An essential role of C02 and H20 during single-walled CNT synthesis from carbon monoxide," Chemical Physics Letters 417 (2005) 179-184.

Nasibulin, Albert G., et al., "Correlation between catalyst particle and single-walled carbon nanotube diameters," Carbon 43 (2005) 2251-2257.

Noordin, Mohamad and Kong Yong Liew, "Synthesis of Alumina Nanofibers and Composites," in Nanofibers, pp. 405-418 (Ashok Kumar, ed., 2010) ISBN 978-953-7619-86-2 (available at http://www.intechopen.com/books/nanofibers/synthesis-of-alumina•nanofibers-and-composites).

Pender, Mark J., et al., "Molecular and polymeric precursors to boron carbide nanofibers, nanocylinders, and nanoporous ceramics," Pure Appl. Chem., vol. 75, No. 9, pp. 1287-1294, 2003.

Ruckenstein, E. and H.Y. Wang, "Carbon Deposition and Catalytic Deactivation during C02 Reforming of CH4 over Co/?-Al203 Catalysts," Journal of Catalysis, vol. 205, Issue 2, Jan. 25, 2002, pp. 289-293.

Sacco, Albert Jr., "An Investigation of the Reactions of Carbon Dioxide, Carbon Monoxide, Methane, Hydrogen, and Water over Iron, Iron Carbides, and Iron Oxides," PhD Dissertation, Massachusetts Institute of Technology, Jul. 1977, pp. 2, 15-234.

SAE 820875 Utilization of Ruthenium and Ruthenium-Iron Alloys as Bosch Process Catalysts. Jul. 19-21, 1982.

SAE 911451 Optimization of Bosch Reaction, Jul. 15-18, 1991.

Singh, Jasprit, Semiconductor Devices, An Introduction, 1994, pp. 86-93, 253-269.

Singh, Jasprit, Semiconductor Devices, Basic Principles, Chapter 6, Semiconductor Junctions with Metals and Insulators, 2001, pp. 224-244, Wiley.

Skulason, Egill, Metallic and Semiconducting Properties of Carbon Nanotubes, Modern Physics, Nov. 2005, slide presentation, 21 slides, available at https://notendur.hi.is/egillsk/stuff/annad/Egiii.Slides2.pdf, last visited Apr. 28, 2014.

Songsasen, Apisit and Paranchai Pairgreethaves, "Preparation of Carbon Nanotubes by Nickel Catalyzed Decomposition of Liquefied Petroleum Gas (LPG)," Kasetsart J. (Nat. Sci.) 35 : 354-359 (2001) (available at: http://kasetsartjournal.ku.ac.th/kuj_files/2008/A0804251023348734.pdf).

Szakalos, P., "Mechanisms and driving forces of metal dusting," Materials and Corrosion, 2003, 54, No. 10, pp. 752-762.

Tsai, Heng-Yi, et al., "A feasibility study of preparing carbon nanotubes by using a metal dusting process," Diamond & Related Materials 18 (2009) 324-327, Elsevier.

(56) References Cited

OTHER PUBLICATIONS

Tse, Anthony N., Si—Au Schottky Barrier Nuclear Battery, A Thesis submitted to the Faculty in partial fulfillment of the requirement for the degree of Doctor of Engineering, Thayer School of Engineering, Dartmouth College, Hanover, New Hampshire, Nov. 1972, pp. 31-57.

Wilson, Richard B., "Fundamental Investigation of the Bosch Reaction," PhD Dissertation, Massachusetts Institute of Technology, Jul. 1977, pp. 12,23, 37, 43, 44, 62, 70, 80, 83-88, 98.

Wei, et al. "The mass production of carbon nanotubes using a nano-agglomerate fluidized bed reactor: A multiscale space-time analysis," Powder Technology 183 (2008) 10-20, Elsevier.

XP-002719593 Thomson abstract.

Zeng, Z., and Natesan, K., Relationship between the Growth of Carbon Nanofilaments and Metal Dusting Corrosion, 2005, Chem. Mater. 2005, 17, 3794-3801.

PCT International Search Report and Written Opinion, PCT/US2013/000081, dated Jul. 12, 2013.

\* cited by examiner

METHODS OF CAPTURING AND SEQUESTERING CARBON

PRIORITY CLAIM

This application claims the benefit of the filing date of U.S. Provisional Patent Application Ser. No. 61/624,462, filed Apr. 16, 2012, for "Methods and Systems for Capturing and Sequestering Carbon and for Reducing the Mass of Carbon Oxides in a Waste Gas Stream," the disclosure of which is hereby incorporated herein in its entirety by this reference.

TECHNICAL FIELD

Embodiments of the disclosure relate to carbon capture and storage by conversion of gaseous carbon oxides into solid carbon products.

BACKGROUND

U.S. Patent Publication No. 2012/0034150 A1, published Feb. 9, 2012, the disclosure of which is hereby incorporated herein in its entirety by this reference, discloses background information hereto.

Additional information is disclosed in the following documents, the disclosure of each of which is hereby incorporated herein in its entirety by this reference:
1. International Application No. PCT/US13/00072, filed on even date herewith, for "Methods and Structures for Reducing Carbon Oxides with Non-Ferrous Catalysts," which claims the benefit of U.S. Ser. No. 61/624,702, filed Apr. 16, 2012, in the name of Dallas B. Noyes;
2. International Application No. PCT/US13/00076, filed on even date herewith, for "Methods and Systems for Thermal Energy Recovery from Production of Solid Carbon Materials by Reducing Carbon Oxides," which claims the benefit of U.S. Ser. No. 61/624,573, filed Apr. 16, 2012, in the name of Dallas B. Noyes;
3. International Application No. PCT/US13/00077, filed on even date herewith, for "Methods for Producing Solid Carbon by Reducing Carbon Dioxide," which claims the benefit of U.S. Ser. No. 61/624,723, filed Apr. 16, 2012, in the name of Dallas B. Noyes;
4. International Application No. PCT/US13/00073, filed on even date herewith, for "Methods and Reactors for Producing Solid Carbon Nanotubes, Solid Carbon Clusters, and Forests," which claims the benefit of U.S. Ser. No. 61/624,753, filed Apr. 16, 2012, in the name of Dallas B. Noyes;
5. International Application No. PCT/US13/00075, filed on even date herewith, for "Methods for Treating an Offgas Containing Carbon Oxides," which claims the benefit of U.S. Ser. No. 61/624,513, filed Apr. 16, 2012, in the name of Dallas B. Noyes;
6. International Application No. PCT/US13/00071, filed on even date herewith, for "Methods for Using Metal Catalysts in Carbon Oxide Catalytic Converters," which claims the benefit of U.S. Ser. No. 61/624,848, filed Apr. 16, 2012, in the name of Dallas B. Noyes;
7. International Application No. PCT/US13/00078, filed on even date herewith, for "Methods and Systems for Forming Ammonia and Solid Carbon Products," which claims the benefit of U.S. Ser. No. 61/671,464, filed Jul. 13, 2012, in the name of Dallas B. Noyes; and
8. International Application No. PCT/US13/00079, filed on even date herewith, for "Carbon Nanotubes Having a Bimodal Size Distribution," which claims the benefit of U.S. Ser. No. 61/637,229, filed Apr. 23, 2012, in the name of Dallas B. Noyes.

Solid carbon has numerous commercial applications. These applications include uses of carbon black and carbon fibers as a filler material in tires, inks, etc., uses for various forms of graphite (e.g., as electrodes and pyrolytic graphite in heat shields), and innovative and emerging applications for buckminsterfullerene and carbon nanotubes. Conventional methods for the manufacture of various forms of solid carbon typically involve the pyrolysis of hydrocarbons in the presence of a suitable catalyst. Hydrocarbons are typically used as the carbon sources due to historically abundant availability and relatively low cost. The use of carbon oxides as the carbon source in the production of solid carbon has largely been unexploited.

Carbon oxides, particularly carbon dioxide ($CO_2$), are abundant gases that may be extracted from point source emissions such as the exhaust gases of hydrocarbon combustion or from some process off-gases. $CO_2$ may also be extracted from the air. Because point source emissions have much higher concentrations of $CO_2$ than does air, they are often economical sources from which to harvest $CO_2$.

$CO_2$ is increasingly available and inexpensive as a byproduct of power generation and chemical processes in which an object may be to reduce or eliminate the emission of $CO_2$ into the atmosphere by capture and subsequent sequestration of the $CO_2$ (e.g., by injection into a geological formation). Carbon oxides are also a product of other industrial sources such as natural gas from wells and landfills, combustion off-gases, Portland cement calciner off-gases, fermentation off gases, and various other chemical processes that result in carbon oxides or syngas. Attempts have been made to reduce the emission of carbon dioxide to the atmosphere by capturing the carbon dioxide and subsequently sequestering it (often by injection into a geological formation). For example, the capture and sequestration of $CO_2$ is the basis for some "green" coal-fired power stations. In current practice, capture and sequestration of the $CO_2$ entails significant cost. Thus, an economically viable use for $CO_2$ or a more economical means of sequestering $CO_2$ could be useful.

There is a spectrum of reactions involving carbon, oxygen, and hydrogen wherein various equilibria have been identified that yield solid carbon as a reaction product. Hydrocarbon pyrolysis involves equilibria between hydrogen and carbon that favors solid carbon production, typically with little or no oxygen present. The Boudouard reaction, also called the "carbon monoxide disproportionation reaction," is the range of equilibria between carbon and oxygen that favors solid carbon production, typically with little or no hydrogen present. The Bosch reaction occurs within a region of equilibria where all of carbon, oxygen, and hydrogen are present under reaction conditions that also favor solid carbon production and characteristically has water as a co-product due to the reduction of the carbon oxides by the hydrogen present in the reaction constituents.

The relationship between the hydrocarbon pyrolysis, Boudouard, and Bosch reactions may be understood in terms of a C—H—O equilibrium diagram, as shown in FIG. 1. The C—H—O equilibrium diagram of FIG. 1 shows various known routes to solid carbon, including carbon nanotubes ("CNTs"). The hydrocarbon pyrolysis reactions occur on the equilibrium line that connects H and C and in the region near the left edge of the triangle to the upper left of the dashed lines. Two dashed lines are shown because the transition between the pyrolysis zone and the Bosch reaction zone may change with reactor temperature. The Boudouard, or carbon monoxide disproportionation reactions, occur near the equilibrium line that connects O and C (i.e., the right edge of the triangle). The equilibrium lines for various temperatures that traverse the diagram show the approximate regions in which solid carbon will form. For each temperature, solid carbon may form in the regions above the associated equilibrium line, but will not generally form in the regions below the equilibrium line. The Boudouard reaction zone appears at the right side of the triangle. In this zone, the Boudouard reaction is thermodynamically preferred over the Bosch reaction. In the region between the pyrolysis zone and the Boudouard reaction zone and above a particular reaction temperature curve, the Bosch reaction is thermodynamically preferred over the Boudouard reaction.

CNTs are valuable because of their unique material properties, including strength, current-carrying capacity, and thermal and electrical conductivity. Current bulk use of CNTs includes use as an additive to resins in the manufacture of composites. Research and development on the applications of CNTs is very active with a wide variety of applications in use or under consideration. One obstacle to widespread use of CNTs has been the cost of manufacture.

U.S. Pat. No. 7,794,690 (Abatzoglou et al.) teaches a dry reforming process for sequestration of carbon from an organic material. Abatzoglou discloses a process utilizing a 2D carbon sequestration catalyst with, optionally, a 3D dry reforming catalyst. For example, Abatzoglou discloses a two-stage process for dry reformation of an organic material (e.g., methane, ethanol) and $CO_2$ over a 3D catalyst to form syngas, in a first stage, followed by carbon sequestration of syngas over a 2D carbon steel catalyst to form CNTs and carbon nanofilaments. The 2D catalyst may be an active metal (e.g., Ni, Rh, Ru, Cu—Ni, Sn—Ni) on a nonporous metallic or ceramic support, or an iron-based catalyst (e.g., steel), on a monolith support. The 3D catalyst may be of similar composition, or may be a composite catalyst (e.g., $Ni/ZrO_2$—$Al_2O_3$) over a similar support. Abatzoglou teaches preactivation of a 2D catalyst by passing an inert gas stream over a surface of the catalyst at a temperature beyond its eutectic point, to transform the iron into its alpha phase. Abatzoglou teaches minimizing water in the two-stage process or introducing water in low concentrations (0 to 10 wt %) in a reactant gas mixture during the dry reformation first stage.

U.S. Patent Application Publication No. 2012/0034150 A1 discloses methods for the catalytic conversion of carbon oxides to solid carbon products using reducing agents in the presence of a catalyst. The methods disclosed relate generally to a catalytic conversion process for reducing carbon oxides to a valuable solid carbon product, and, more particularly, to the use of carbon oxides (e.g., carbon monoxide and carbon dioxide) as the primary carbon source for the production of solid carbon using a reducing agent (such as hydrogen or a hydrocarbon) typically in the presence of a catalyst. Thus, the methods involve catalytic conversion of carbon oxides (primarily carbon monoxide and carbon dioxide) to solid carbon and water. The methods may use the atmosphere, combustion gases, process off-gases, well gas, and other natural or industrial sources of carbon oxides. The carbon oxides may be separated from these sources and concentrated as necessary. These methods may be used to commercially manufacture various morphologies of solid carbon products and for the catalytic conversion of carbon oxides to solid carbon and water.

DISCLOSURE

Methods of capturing and sequestering carbon may include introducing an initial process gas stream including at least one carbon oxide to a catalytic converter structured and adapted to convert a portion of the carbon in the carbon oxide to solid carbon and a reaction product gas stream containing water vapor. The solid carbon is removed from the catalytic converter for disposal or storage thereof. At least a portion of the reaction product gas stream is recycled to the catalytic converter. The reaction product gas stream includes a portion of the initial process gas stream and at least a portion of the water vapor produced in the catalytic converter.

Methods of capturing and sequestering carbon from a gaseous source containing carbon oxides may include concentrating the carbon oxide content of the gaseous source to form an initial process gas stream, reacting the initial process gas stream with a reducing agent in the presence of a catalyst to produce solid carbon and a residual process gas stream comprising unreacted carbon oxides, unreacted reducing agent, and water vapor, separating the solid carbon from the residual process gas stream, and recycling at least a portion of the residual process gas stream to combine with the gaseous source.

In certain embodiments hereof, the partial pressure of water in the reaction is regulated by various means, including recycling and condensation of water, to influence, for example, the structure or other aspects of the composition of carbon products produced. The partial pressure of water appears to assist in obtaining certain desirable carbon allotropes.

In certain embodiments, a broad range of inexpensive and readily-available catalysts, including steel-based catalysts, are described, without the need for activation of the catalyst before it is used in a reaction. Iron alloys, including steel, may contain various allotropes of iron, including alpha-iron (austenite), gamma iron, and delta-iron. In some embodiments, reactions disclosed herein advantageously utilize an iron-based catalyst, wherein the iron is not in an alpha phase. In certain embodiments, a stainless steel containing iron primarily in the austenitic phase is used as a catalyst.

Catalysts, including an iron-based catalyst (e.g., steel, steel wool), may be used without a need for an additional solid support. In certain embodiments, reactions disclosed herein proceed without the need for a ceramic or metallic support for the catalyst. Omitting a solid support may simplify the setup of the reactor and reduce costs.

Systems for capturing and sequestering carbon from a gaseous source containing carbon oxides may include concentrator means for concentrating the carbon oxide content of the gaseous source to form an initial process gas stream, reactor means for reacting the initial process gas stream with a reducing agent in the presence of a catalyst to produce solid carbon and a residual process gas stream comprising unreacted carbon oxides, the reducing agent, and water vapor, solid separation means for separating the solid carbon from the residual process gas stream, and recycle means for recycling at least a portion of the residual process gas stream to combine with the gaseous source.

BRIEF DESCRIPTION OF THE DRAWINGS

Features and advantages of the disclosure will be apparent from reference to the following detailed description taken in conjunction with the accompanying drawings, in which.

MODE(S) FOR CARRYING OUT THE INVENTION

Figure 1:
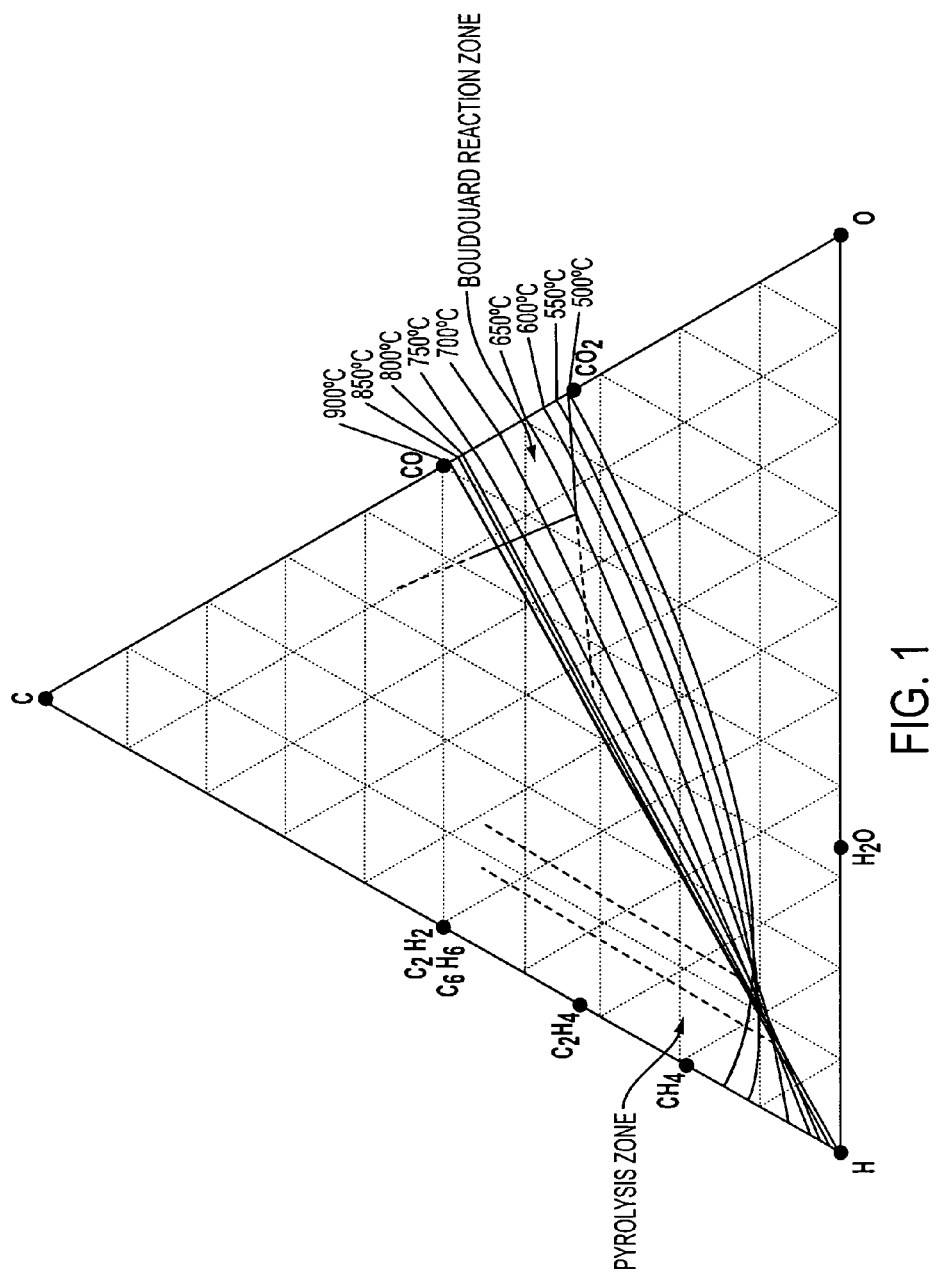
FIG. 1 depicts a C—H—O equilibrium diagram.

This disclosure includes method and systems for capturing and sequestering carbon oxides by converting them to solid carbon in a catalytic conversion process. The production of solid carbon from carbon oxides may be profitable, providing economic motivation for sequestering carbon oxides through the catalytic conversion processes disclosed herein. Carbon oxides from any industrial process may be used as disclosed herein, such as from hydrocarbon combustion process, calcination processes, mining processes, refining processes, etc. Systems may include a carbon oxide concentrator and a catalytic converter.

As an example of the method, a carbon oxide gas stream flows from a carbon oxide concentrator into a carbon oxide catalytic conversion unit, where the carbon oxide gas stream is mixed with a reducing gas, such as methane, hydrogen, a hydrocarbon, or a mixture thereof. At least some of the carbon oxides are catalytically converted to solid carbon, which is removed from the catalytic converter for commercial use or for storage for long-term sequestration. The catalytic converter includes a catalyst selected to promote the Bosch reaction. Control of water vapor in the gas stream is important in the production of solid carbon. With too much water, the water gas reaction will occur, converting the water and solid carbon to syngas. Some catalysts are poisoned by high concentrations of water in the gas stream. Because water is produced in the Bosch reaction, at least a portion or even all of the product water may be condensed and removed from the reaction product gases prior to recycling the residual process gas stream. The removal of water may occur in the catalytic conversion system, in the carbon oxide concentrator, or as a separate gas processing step within the system. The residual process gas stream is recycled back to the carbon oxide concentrator, where it is mixed with a carbon oxide source gas stream or with an appropriate intermediate gas stream. Discharge gases containing a reduced concentration of carbon oxides or a reduced volume of carbon oxides are expelled from the catalytic conversion unit. By removing some of the water vapor in the recycled gases, the morphology of solid carbon formed may be controlled. Changing the partial pressure of water vapor changes the carbon activity of a mixture.

Carbon activity ($A_c$) can be used as an indicator of whether solid carbon will form under particular reaction conditions (e.g., temperature, pressure, reactants, concentrations). Without being bound to any particular theory, it is believed that carbon activity is the key metric for determining which allotrope of solid carbon is formed. Higher carbon activity tends to result in the formation of CNTs, lower carbon activity tends to result in the formation of graphitic forms.

Carbon activity for a reaction forming solid carbon from gaseous reactants can be defined as the reaction equilibrium constant times the partial pressure of gaseous products, divided by the partial pressure of reactants. For example, in the reaction, $CO_{(g)} + H_{2(g)} \leftrightarrow C_{(s)} + H_2O_{(g)}$, with a reaction equilibrium constant of K, the carbon activity $A_c$ is defined as $K \cdot (P_{CO} \cdot P_{H2} / P_{H2O})$. Thus, $A_c$ is directly proportional to the partial pressures of CO and $H_2$, and inversely proportional to the partial pressure of $H_2O$. Higher $P_{H2O}$ tends to inhibit CNT formation. The carbon activity of this reaction may also be expressed in terms of mole fractions and total pressure: $A_c = K \cdot P_T \cdot Y_{CO} \cdot Y_{H2} / Y_{H2O}$), where $P_T$ is the total pressure and Y is the mole fraction of a species. Carbon activity generally varies with temperature because reaction equilibrium constants vary generally with temperature. Carbon activity also varies with total pressure for reactions in which a different number of moles of gas are produced than are consumed. Mixtures of solid carbon allotropes and morphologies thereof can be achieved by varying the catalyst and the carbon activity of the reaction gases in the reactor.

Figure 2:
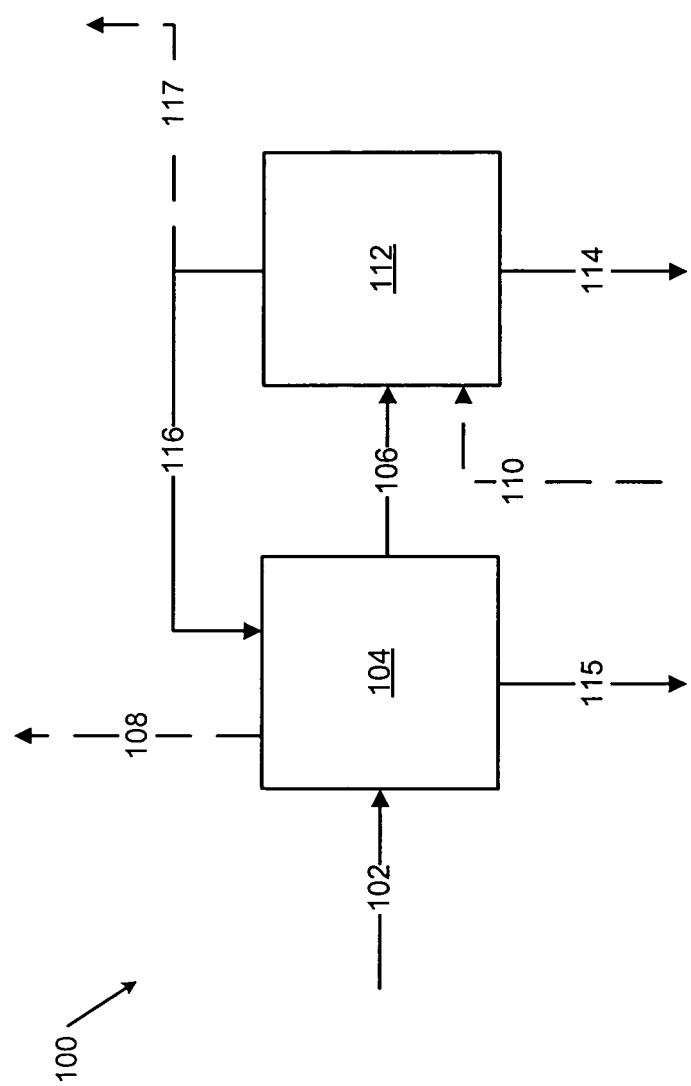
FIG. 2 is a simplified process flow diagram depicting an apparatus for carbon capture and sequestration according to one embodiment of the method.

FIG. 2 depicts a simplified process flow diagram of one embodiment of a system 100 for capturing carbon and a method that may be performed using the system 100. A source gas stream 102 containing carbon oxides flows into a carbon oxide concentrator 104, in which the carbon oxides of the source gas stream 102 are concentrated. A process gas stream 106 is separated from discharge gases 108 in the carbon oxide concentrator 104. The process gas stream 106 flows with a reducing gas 110 to a catalytic converter 112. The reducing gas 110 is optional if the process gas stream 106 contains a suitable mixture of carbon oxide and reducing gas. A solid carbon product 114 is removed from the system 100, and a residual gas stream 116 is recycled back to the carbon oxide concentrator 104. A vent gas stream 117 is typically bled from the residual gas stream 116 and various unit operations in the catalytic converter 112 which ensures that inert gases do not accumulate in the system. The vent gas stream 117 may be a substantial part of the residual gas stream 116 coming from the catalytic converter 112.

The source gas stream 102 may include any source gas having one or more carbon-containing components. The source gas stream 102 may also include components that do not contain carbon. For example, the source gas stream 102 may include natural gas or other hydrocarbons, hydrogen, nitrogen, ammonia, carbon dioxide, carbon monoxide, oxygen, argon, sulfur-containing gases, or any other gaseous species. For example, the source gas stream 102 may include syngas, a mixture of primarily hydrogen and carbon monoxide, and may also include carbon dioxide. If the source gas stream 102 includes hydrocarbons, the hydrocarbons may be gaseous at the temperature and pressure at which the source gas stream 102 is supplied. For example, the source gas stream 102 may include lower molecular weight alkyl, alkenyl, and cyclic carbon compounds which consist of only carbon and hydrogen. In some embodiments, the source gas stream 102 may include gases from industrial sources such as petroleum wells, landfills, combustion engines, fermenters, or any other operation. The source gas stream 102 may include primarily carbon monoxide or carbon dioxide. For example, carbon dioxide and/or carbon monoxide may compose greater than 80%, greater than 90%, greater than 95%, or even greater than 99% of the carbon-containing components of the source gas stream 102. In other embodiments, the source gas stream 102 may include carbon-containing component gases in addition to carbon oxides. The source gas stream 102 may also include one or more inert gases (e.g., nitrogen, argon, helium, etc.). Source gas streams 102 including both carbon dioxide and carbon monoxide gases may be produced by a wide variety of industrial activity. Carbon dioxide is also available from a variety of natural sources (e.g., the atmosphere and subterranean natural gas, carbon dioxide, and petroleum-containing formations).

The carbon oxide concentrator 104 may be any device capable of increasing the concentration of one or more carbon-containing components of the source gas stream 102. Typically, the carbon oxide concentrator 104 separates the process gas stream 106 (which has a higher concentration of carbon-containing components than the source gas stream 102) from the discharge gases 108 (which have a lower concentration of carbon-containing components than the source gas stream 102). For example, the carbon oxide concentrator 104 may include condensers, membranes (e.g., ceramic membranes, organic membranes, etc.), cryogenic distillation columns, amine absorption separation systems, pressure swing absorption systems and/or any other carbon oxide gas-separation device. The discharge gases 108 may include one or more gases present in the source gas stream 102. For example, the discharge gases 108 may include oxygen, nitrogen, argon, etc. The carbon oxide concentrator 104 may be configured to separate particular gases, and may include two or more devices operated in series or in parallel to provide any selected purity (i.e., concentration of CO, $CO_2$, or another carbon-containing component) of the process gas stream 106. The discharge gases 108 may be further purified and vented to the atmosphere. Typically, discharge gases 108 expelled from the carbon oxide concentrator 104 contain a lower concentration of carbon oxides than the source gas stream 102. The carbon oxide concentrator 104 may produce a process gas stream 106 consisting predominantly or essentially of CO and $CO_2$. For example, the process gas stream 106 may include at least 90% CO and $CO_2$, at least 95% CO and $CO_2$, or even at least 98% CO and $CO_2$.

The carbon oxide concentrator 104 typically includes means for separating water and controlling the water vapor pressure in the process gas stream 106. The water stream 115 is removed from the carbon oxide concentrator 104 and may be discharged or may be electrolyzed to provide at least some of the reducing gas 110. There are many suitable means for removing the water stream 115 to control the resulting water vapor in the process gas stream 106. In one embodiment, the water stream 115 is separated from the source gas stream 102, residual gas stream 116, or mixtures thereof, by one or more condensers with suitable controls to control the water vapor concentration in the process gas stream 106. In another embodiment, the water stream 115 is separated by means of a barometric condenser. The water vapor pressure within the reactor of the catalytic converter 112 may influence the allotropes and morphologies of solid carbon formed, the deposition rate of the solid carbon, and the catalyst activity, and may be controlled to achieve the desired operation and solid carbon product quality from the catalytic converter 112.

In some embodiments, the discharge gases 108 may include a portion of the carbon-containing components contained in the source gas stream 102. In other embodiments, the discharge gases 108 may be substantially free of carbon-containing components (e.g., the discharge gases 108 may contain less than 10%, less than 5%, less than 1%, or even less than 0.1% carbon-containing components). The discharge gases 108 typically have a carbon content lower than the carbon content of the source gas stream 102. For example, the discharge gases 108 may have a carbon content of less than 10% of the carbon content of the source gas stream 102, less than 5% of the carbon content of the source gas stream 102, less than 1% of the carbon content of the source gas stream 102, or even less than 0.1% of the carbon content of the source gas stream 102.

The configuration and operation of the carbon oxide concentrator 104 may depend on process requirements (e.g., gas flow rates, pressures, energy availability, environmental regulations, safety regulations, costs, etc.) For example, economics may dictate that both the process gas stream 106 and the discharge gases 108 contain some carbon-containing components. That is, separation of the carbon-containing components entirely into the process gas stream 106 may not be profitable. In such cases, certain carbon-containing components (or a portion of certain carbon-containing components) may be exhausted with the discharge gases 108 or processed in another operation.

The process gas stream 106 and the reducing gas 110, enter the catalytic converter 112. The reducing gas 110 may include additional species to promote the catalytic conversion process of the carbon-containing components of the process gas stream 106. The reducing gas 110 may include, for example, hydrogen, methane, another hydrocarbon, etc. The reducing gas 110, if present, may mix with the process gas stream 106 before entering the catalytic converter 112 (e.g., within a mixing valve) or within the catalytic converter 112.

The catalytic converter 112 is typically a system consisting of at least a reactor suitable for converting at least a portion of the carbon oxides reducing gases in the process gas stream 106 into solid carbon product and water, together with means for removing the solid carbon product 114 from the catalytic converter and suitable appurtenances for heating and circulating reaction gases within the catalytic converter 112. The reactor portion of the catalytic converter 112 may be any reactor configured to provide conditions favorable to the conversion of carbon-containing components (i.e., gases) to solid carbon products, such as graphite (e.g., pyrolytic graphite), graphene, carbon black, soot, fibrous carbon, buckminsterfullerenes, single-wall CNTs, multi-walled CNTs, carbon platelets, or nanodiamond. The catalytic converter 112 may include one or more reactors of any reactor design or combination of reactor designs that facilitates the formation or collection of a desired solid carbon product. For example, the catalytic converter 112 may include a fluidized-bed reactor, a fluid-wall reactor, a packed-bed reactor, an aerosol reactor, etc.

In some embodiments, the catalytic converter 112 includes one or more aerosol reactors in which a catalyst is preformed and selected for a specific size distribution, mixed into a liquid or carrier gas solution, and then sprayed into the reactor (e.g., via electrospray). Solid carbon particles may form on the catalyst, and particles may settle or deposit within the catalytic converter 112 or in associated piping. Gas flow may transport the product out of the catalytic converter 112. In another embodiment, the catalytic converter 112 includes one or more fluidized bed reactors into which catalyst particles or catalyst-coated particles are introduced, and in which solid carbon is grown on the surface of the particles. The solid carbon may be either elutriated within the reactor portion of the catalytic converter 112, and carried out of the reactor portion of the catalytic converter 112 entrained in the reaction gases, or the catalyst particles with solid carbon affixed to the surface thereof may be harvested and the solid carbon removed from the surface, and the catalyst particles may optionally be returned to the reactor portion of the catalytic converter 112.

The catalytic converter 112 may include one or more batch reactors in which the catalyst either is a fixed solid surface or is mounted on a fixed solid surface (e.g., catalyst nanoparticles deposited on an inert substrate). In such embodiments, solid carbon may form on the catalyst, and the catalyst and solid carbon product 114 may be periodically removed from the catalytic converter 112. Alternatively, the catalytic converter 112 may include continuous reactors, wherein the solid carbon product 114 is removed from the catalyst as the solid carbon is formed. In some embodiments, a solid catalyst or catalyst mounted on a solid substrate passes through a flowing gas stream, the resulting solid carbon product 114 is harvested, and the solid surface is renewed and reintroduced to the catalytic converter 112. The solid catalyst may be the catalyst material (e.g., a solid piece of a chromium-, molybdenum-, cobalt-, iron-, or nickel-containing alloy or superalloy, or a mixture of metals) or an inert substrate on which the catalyst material is mounted.

In one embodiment, the catalytic converter 112 may include a fluidized-bed reactor designed to retain the catalyst while allowing the solid carbon product 114 to be entrained in the gas flow and to be lofted out of the reaction zone upon reaching a desired size. The shape of the reactor and the gas flow rates may control the residence time of the elutriates and the corresponding size of the solid carbon product 114 (e.g., the length of CNTs).

Reaction conditions of the catalytic converter 112 (e.g., time, temperature, pressure, partial pressure of reactants, partial pressure of water vapor, catalyst properties, etc.) may be optimized to produce a selected type, morphology, purity, homogeneity, etc., of solid carbon. For example, conditions may be selected to promote the formation of CNTs.

The methods disclosed herein may include a variety of separation technologies. Once the carbon oxide and reducing gases have reacted in the catalytic converter 112, the resulting solid carbon product 114 is removed from the catalytic converter 112, and may be stored for long-term sequestration, sold as a commercial product, used in the production of another product, etc. The residual gas stream 116 includes those gases that remain in the catalytic converter 112 after the reaction and separation of the solid carbon product 114. The techniques for separation of the solid carbon product 114 from the residual gas stream 116 may depend on the type of reactor used in the catalytic converter 112. In one embodiment, a cyclone separator is used to separate and collect the solid carbon product 114. In another embodiment, a venturi scrubber is used to separate and collect the solid carbon product 114. In yet another embodiment, a bag house is used to separate and collect the solid carbon product 114. The solid carbon product 114 may be collected and separated from the residual gas stream 116 by elutriation, centrifugation, electrostatic precipitation, filtration, scrubbing, or any other method.

The residual gas stream 116 may be recycled back to the carbon oxide concentrator 104 or may be discharged as part of or as the entire vent gas stream 117. The residual gas stream 116 may be mixed with the source gas stream 102 before entering the carbon oxide concentrator 104 or within the carbon oxide concentrator 104. In some embodiments, the residual gas stream 116 or a portion thereof may be mixed with another gas, such as the process gas stream 106.

Typically, the gases are not recirculated solely within the catalytic converter 112 (though some circulation may occur within the catalytic converter 112). Instead, the residual gas stream 116 recirculates to the carbon oxide concentrator 104. The residual gas stream 116 is then reprocessed with the source gas stream 102. The carbon oxides in the residual gas stream 116 are re-concentrated, and accumulated inert gases or non-reactive constituents may be eliminated via the discharge gases 108. Alternatively, the residual gas stream 116 may be discharged to the atmosphere, to geological storage, or to another process.

Figure 3:
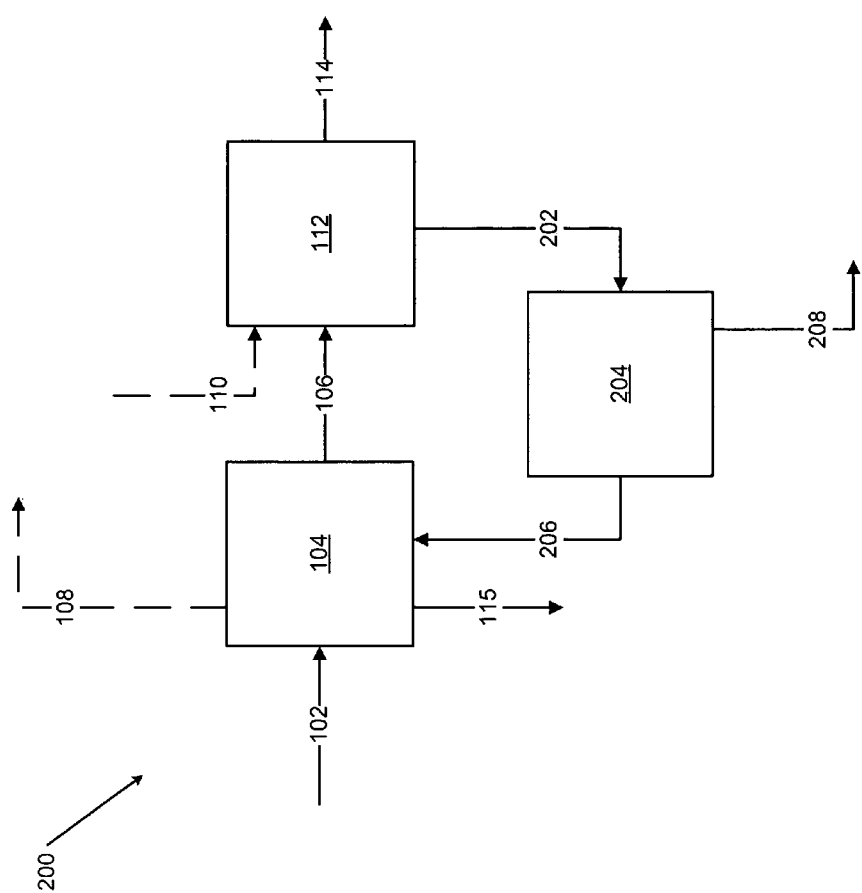
FIG. 3 is a simplified process flow diagram depicting a single-stage catalytic converter with water removal and recycle of residuals to the carbon oxide concentrator.

FIG. 3 depicts a simplified process flow diagram of another embodiment of a system 200 for capturing and sequestering carbon and a method that may be performed using the system 200. The system 200 differs from the system 100 of FIG. 2 in that water is removed from an intermediate gas stream 202 in the system 200. As described above, a source gas stream 102 enters a carbon oxide concentrator 104, in which carbon-containing components in the source gas stream 102 are concentrated. A water stream 115 may be removed from the carbon oxide concentrator 104 and may be discharged or may be electrolyzed to provide at least some of the reducing gas 110. The resulting process gas stream 106 (which contains concentrated carbon-containing components) is mixed with a reducing gas 110 (e.g., hydrogen, methane, another hydrocarbon, etc.) within or before entering the catalytic converter 112. The solid carbon product 114 formed in the catalytic converter 112 is removed as described above.

The intermediate gas stream 202 leaving the catalytic converter 112 passes to a water removal device 204 before being recycled back to the carbon oxide concentrator 104. The water removal device 204 separates a water stream 208 from a dried intermediate gas stream 206. The water removal device 204 may be, for example, a condenser. The dried intermediate gas stream 206 may have a dew point of less than 20° C., less than 0° C., or even less than −20° C. The water stream 208 may include water vapor that forms in the catalytic converter 112 and/or water present in the source gas stream 102, (e.g., as vapor, water droplets, as coatings on aerosol particles, bound in hydrated solids, etc.). The water stream 208 may be collected, stored, or used in other operations.

The dried intermediate gas stream 206 may be mixed with the source gas stream 102 before or within the carbon oxide concentrator 104. In other embodiments, the dried intermediate gas stream 206 may be mixed with the process gas stream 106. Discharge gases 108 containing a reduced concentration of carbon oxides may be released from the carbon oxide concentrator 104.

The system 100 depicted in FIG. 2 does not include a water removal device separate from the carbon oxide concentrator 104. That is, the residual gas stream 116 is recycled to the carbon oxide concentrator 104, and removal of water occurs directly from the carbon oxide concentrator. Some water may also be removed in the discharge gases 108. The system 200 depicted in FIG. 3 may be preferred to the system 100 depicted in FIG. 2 in situations in which the resulting water 208 is of value, such as in oil and well-gas processing, and in environments lacking sufficient freshwater sources. The system 200 may also limit or prevent interference of water with the operation of the catalytic converter 112 and/or the carbon oxide concentrator 104. In some embodiments, the water removal device 204 may provide additional water removal capacity beyond the water removal capacity of the carbon oxide concentrator 104. The system 100 may be preferred in situations in which there is no value in recovering the water or in which the carbon oxide concentrator 104 includes sufficient water removal equipment.

Figure 4:
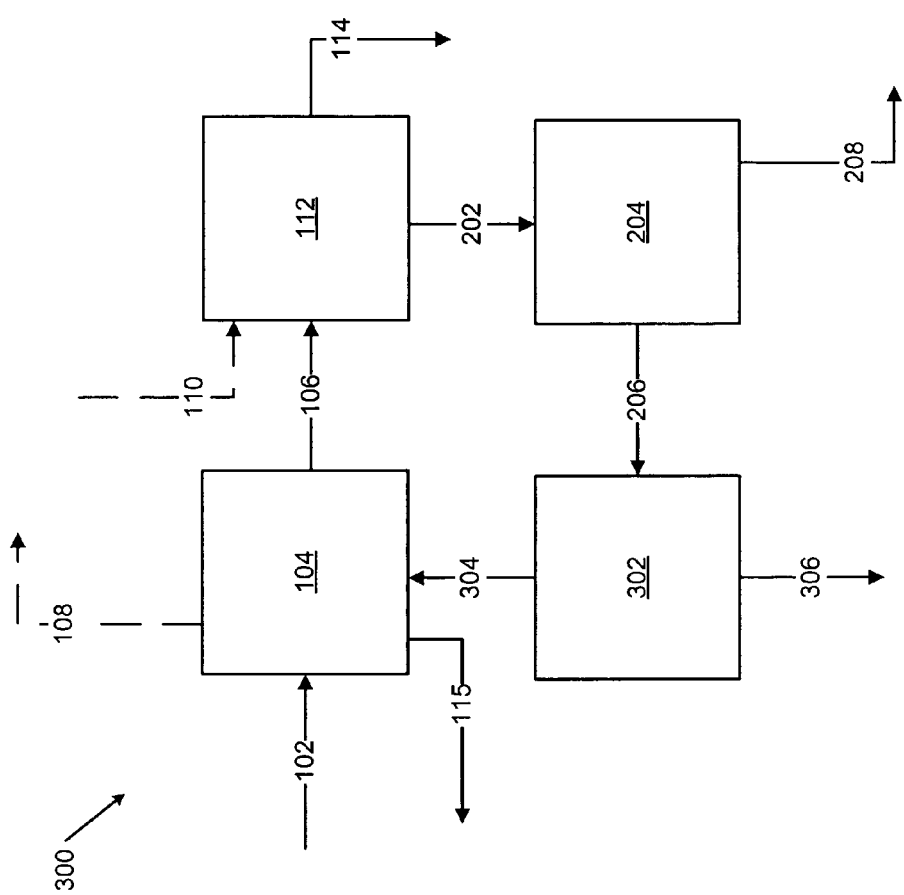
FIG. 4 is a simplified process flow diagram depicting a two-stage catalytic converter with inter-stage water removal and recycle of residuals to the carbon oxide concentrator.

FIG. 4 depicts a simplified process flow diagram of another embodiment of a system 300 for capturing and sequestering carbon and a method that may be performed using the system 300. The system 300 includes two catalytic conversion stages with water removal between the stages. As described above with respect to FIGS. 2 and 3, a source gas stream 102 enters a carbon oxide concentrator 104, where carbon-containing components in the source gas stream are concentrated. The carbon oxide concentrator 104 typically includes means for separating water and controlling the water vapor pressure in the process gas stream 106. The water stream 115 is removed from the carbon oxide concentrator 104 and may be discharged or may be electrolyzed to provide at least some of the reducing gas 110. The resulting process gas stream 106 (which contains concentrated carbon-containing components) is mixed with an optional reducing gas 110 (e.g., hydrogen, methane, another hydrocarbon, etc.) within or before entering the catalytic converter 112. The solid carbon product 114 that results from the reaction in the catalytic converter 112 is removed as described above.

The intermediate gas stream 202 leaving the catalytic converter 112 enters a water removal device 204, which separates water 208 from a dried intermediate gas stream 206. The dried intermediate gas stream 206, which may contain concentrated carbon oxides and reducing gases, flows to a second catalytic converter 302. The second catalytic converter 302 converts carbon oxides to a second solid carbon product 306 and a second intermediate gas stream 304. The second intermediate gas stream 304 may include water, portions of unreacted carbon-containing components, and/or other gases. Optionally, water may be condensed from the second intermediate gas stream 304, as described above. The second intermediate gas stream 304 is recycled from the second catalytic converter 302 back to the carbon oxide concentrator 104, where the second intermediate gas stream 304 is mixed with the source gas stream 102. In some embodiments, the second intermediate gas stream 304 is mixed with an appropriate intermediate gas stream (e.g., the process gas stream 106, the intermediate gas stream 202, etc.). The discharge gases 108 may be expelled from the carbon oxide concentrator 104 and the system 300. In the system 300, the discharge gases 108 may contain a much lower concentration or mass of carbon oxides than in the system 100 of FIG. 2.

The solid carbon product 114 and the second solid carbon product 306 may be removed from the catalytic converter 112 and the second catalytic converter 302, respectively. Either or both the solid carbon product 114 and the second solid carbon product 306 may be used as commercially vendible products or stored in a manner appropriate for long-term sequestration. The solid carbon product 114 and the second solid carbon product 306 may include materials having the same or different morphologies, particle sizes, etc. The solid carbon product 114 and the second solid carbon product 306 may subsequently be mixed to form a salable product.

The system 300 illustrated in FIG. 4 may be beneficial in situations in which the carbon-containing components are sufficiently concentrated in the source gas stream 102 for profitable use of multiple catalytic conversion stages. In some embodiments, additional catalytic conversion stages may be used to promote further conversion. An optimal number of catalytic conversion stages may depend on many factors, including efficiency of the catalytic converters 112, 302, input flow rates, type and quantity of products, number of products, energy costs, equipment costs, maintenance costs, environmental regulations, expected demand for products, etc.

In the system 300 illustrated in FIG. 4, the water removal device 204 may be controlled to achieve a desired partial pressure of water vapor of the dried intermediate gas stream 206 entering the second catalytic converter 302. The control of the water vapor partial pressure may be important to promote a uniform quality of the solid carbon product 114 or the second solid carbon product 306, as well as kinetics of carbon formation. Another water removal device may also be added after the second catalytic converter 302 or after the carbon oxide concentrator 104.

The systems 100, 200, 300 may include pumps, piping, valves, fittings, etc., to allow the transfer of materials into, within, and out of the systems 100, 200, 300. In some embodiments, multiple unit operations may occur in parallel or in series. For example, the process gas stream 106 may be split and passed into two separate catalytic converters 112.

In some embodiments, the source gas stream 102 or the reducing gas 110 may be pressurized before entering the system 100, 200, 300. The pressure of the source gas stream 102 or the reducing gas 110 may be sufficient to cause the transfer of materials through the system 100, 200, 0.300 without further compression or other energy input. In some embodiments, the source gas stream 102 or the reducing gas 110 may be purified, dried, or otherwise treated before entering the system 100, 200, 300.

In methods using multiple catalytic converters 112, 302, inter-stage water removal may regulate reaction rates and types of solid carbon formed in subsequent stages. If the pressure of the process gas stream 106 entering the catalytic converter 112 is sufficiently high, the gases may pass through the catalytic converters 112, 302 and water removal device 204 with no further addition of mechanical energy. Such pressures may be provided at the discharge of the carbon oxide concentrator 104. For example, such pressure may be provided by the pressure of the source gas stream 102. In other embodiments, the process gas stream 106 or dried intermediate gas stream 206 may be pressurized by one or more compressors within the system 100, 200, 300. In some embodiments, the inter-stage water removal may occur without the use of mechanical refrigeration (e.g., air coolers or water coolers).

In any of the operations shown in the figures and described herein, controllers may be configured to maintain selected conditions, as indicated by signals received from one or more sensors. For example, the system 100, 200, 300 may include appropriate means for material handling, controlling gas compositions, mixing, controlling temperature, and/or controlling pressure, controlling flow rates, etc.

Methods and systems described herein may be beneficial in a variety of applications. For example, a system 100, 200, 300 may have lower capital or operating costs than other carbon capture and sequestration systems. If the source gas stream 102 or the reducing gas 110 enter the system 100, 200, 300 at a high enough pressure to travel through the entirety of the system 100, 200, 300, internal pumps, mechanical refrigeration, or other operations, may be omitted. Thus, the expense, maintenance, and energy costs of such operations may be avoided. Also, the use of a water removal device 204 may allow the processing of a source gas stream 102 containing water.

Furthermore, the system 100, 200, 300 may produce one or more valuable products. For example, the solid carbon product 114 and the second solid carbon product 306 may be used for various commercial applications. In some embodiments, water 208 may be a valuable product that may be used in a related industrial application, purified, etc. In some embodiments, water 208 may be electrolyzed or pyrolyzed to form hydrogen and oxygen; the hydrogen may then form at least a portion of the reducing gas 110.

The use of a carbon oxide concentrator 104 to provide a process gas stream 106 having a higher concentration of carbon oxides may reduce the capital cost or operating cost of the catalytic converter 112 or the second catalytic converter 302 by reducing the required size of the catalytic converter 112 or the second catalytic converter 302. Lower capital and operating costs may enhance the economic viability of carbon capture and sequestration of carbon oxides.

In some embodiments, a concentrated carbon oxide stream (e.g., a portion of the process gas stream 106 or the dried intermediate gas stream 206) may pass from a carbon oxide concentration device (e.g., the carbon oxide concentrator 104) to another process or to storage. The conversion of carbon oxides into solid carbon products provides a means for carbon capture and sequestration, thereby potentially decreasing the amount of carbon oxides released to the atmosphere. For example, carbon dioxide may be geosequestered, or stored in an underground formation. In addition to avoiding the costs of disposal (e.g., regulatory fees, purification, etc.), such conversion may provide a valuable product for sale or use in other products. Whether all or a portion of the source gas stream 102 is converted to solid carbon is an economic decision to be made on a case-by-case basis. The methods of the disclosure may be used to convert part, all, or essentially all of the carbon oxides in the source gas stream 102, as circumstances may dictate.

The catalytic converters 112, 302, as shown and described in FIG. 4, may provide a means to produce the solid carbon product 114 and the second solid carbon product 306 with higher efficiency than in a single catalytic converter 112. Furthermore, the use of multiple catalytic converters 112, 302 may allow multiple types or grades of solid carbon products to be formed simultaneously. The reaction conditions of each catalytic converter 112, 302 may be varied as market conditions change, allowing for the production of high-demand products. Such flexibility may improve the economic potential of operating the system 300. Note that the use of multiple catalytic converters can readily be extended to more than two.

Reactions that occur within the catalytic converters 112, 302 may include reactions in the interior region and on the right edge of the phase diagram shown in FIG. 1 (i.e., Boudouard reaction zone and the Bosch reaction zone), where equilibrium may be established between solid carbon, oxygen, and compounds of carbon, hydrogen, and oxygen. The central region of FIG. 1 has several points that are favorable for the formation of CNTs and other forms of solid carbon. The type of solid carbon produced may be selectively controlled through selection and processing of the catalysts, reaction gases, and reaction conditions. Thus, these methods may provide beneficial routes to the production of valuable solid carbon products, such as CNTs, and to the treatment of carbon-containing gases.

The catalytic converters 112, 302 may operate at temperatures from about 450° C. to about 900° C. In some embodiments, the catalytic converters 112, 302 may operate in excess of approximately 650° C., such as in excess of about 680° C. The composition and grain size of catalysts within the catalytic converters 112, 302 may affect the morphology of the resulting solid carbon products. The reaction conditions, including the temperature and pressure of the catalytic converters 112, 302, the residence time, and the grain size of the catalyst may be controlled to obtain solid carbon products having selected characteristics.

Solid carbon may be produced in many different morphologies through the carbon oxide reduction processes of the method. Some of the solid carbon morphologies that may be produced include graphite (e.g., pyrolytic graphite), graphene, carbon black, fibrous carbon, buckminsterfullerene, single-wall CNTs, multi-walled CNTs, carbon platelets, and nanodiamond.

Reaction kinetics favorable to the formation of the desired species of solid carbon may be established through the use of suitable catalysts. Suitable catalysts include metals selected from groups 2 through 15 of the periodic table, such as from groups 5 through 10 (e.g., nickel, molybdenum, chromium, cobalt, tungsten, manganese, ruthenium, platinum, iridium, etc.), actinides, lanthanides, alloys thereof, and combinations thereof. For example, catalysts include iron, nickel, cobalt, molybdenum, tungsten, chromium, and alloys thereof. Note that the periodic table may have various group numbering systems. As used herein, group 2 is the group including Be, group 3 is the group including Sc, group 4 is the group including Ti, group 5 is the group including V, group 6 is the group including Cr, group 7 is the group including Mn, group 8 is the group including Fe, group 9 is the group including Co, group 10 is the group including Ni, group 11 is the group including Cu, group 12 is the group including Zn, group 13 is the group including B, group 14 is the group including C, and group 15 is the group including N. In some embodiments, commercially available metals are used without special preparation. Catalysts may facilitate operations at lower temperatures. In reactions forming CNTs, higher reaction rates may correspond to smaller diameter CNTs, and lower reaction rates may correspond to larger diameter CNTs.

Catalysts may be in the form of nanoparticles or in the form of domains or grains and grain boundaries within a solid material, such as steel or catalyst deposited on the surface of an inert substrate. Catalysts may be selected to have a grain size related to a characteristic dimension of a desired diameter of the solid carbon product (e.g. a CNT diameter). Examples of particularly suitable catalytically active metals are Zn, Fe, Ni, W, V, Cr, Sn, Cu, Co, Mn, and Mo. Catalyst powder may be formed in or near the catalytic converters 112, 302 by injecting an aerosol solution such that upon evaporation of a carrier solvent, a selected particle size distribution results. Alternatively, powdered catalyst material may be entrained in a carrier gas and delivered to the catalytic converters 112, 302. By selecting the catalyst and the reaction conditions, the process may be tuned to produce selected morphologies of solid carbon product. Catalysts may be formed as described in U.S. Patent Application Publication No. 2012/0034150 A1. In some embodiments, the catalyst may be formed over a substrate or support, such as an inert oxide that does not participate in the reactions. However, the substrate is not necessary; in other embodiments, the catalyst material is an unsupported material, such as a bulk metal or particles of metal not connected to another material (e.g., loose particles, shavings, or shot, such as may be used in a fluidized-bed reactor).

304 stainless steel appears to catalyze the formation of CNTs under a wide range of temperatures, pressures, and gas compositions. However, the rate of formation of CNTs on 304 stainless steel appears to be relatively low, such that 304 stainless steel may be used effectively as a construction material for process equipment, with minimal deposition on surfaces thereof in normal operations. 316L stainless steel, in contrast, appears to catalyze the formation of solid carbon at significantly higher rates than 304 stainless steel, but may also form various morphologies of carbon. Thus, 316L stainless steel may be used as a catalyst to achieve high reaction rates, but particular reaction conditions may be maintained to control product morphology. Catalysts may be selected to include Cr, such as in amounts of about 22% or less by weight. For example, 316L stainless steel contains from about 16% to about 18.5% Cr by weight. Catalysts may also be selected to include Ni, such as in amounts of about 8% or more by weight. For example, 316L stainless steel contains from about 10% to about 14% Ni by weight. Catalysts of these types of steel have iron in an austenitic phase, in contrast to alpha-phase iron used as a catalyst in conventional processes. Given the good results observed with 316L stainless steel, the Ni and/or Cr may have a synergistic effect with Fe.

Oxidation and subsequent reduction of the catalyst surface alter the grain structure and grain boundaries. Without being bound by any particular theory, oxidation appears to alter the surface of the metal catalyst in the oxidized areas. Subsequent reduction may result in further alteration of the catalyst surface. Thus, the grain size and grain boundary of the catalyst may be controlled by oxidizing and reducing the catalyst surface and by controlling the exposure time of the catalyst surface to the reducing gas and the oxidizing gas. The oxidation and/or reduction temperatures may be in the range from about 500° C. to about 1,200° C., from about 600° C. to about 1,000° C., or from about 700° C. to about 900° C. The resulting grain size may range from about 0.1 μm to about 500 μm, from about 0.2 μm to about 100 μm, from about 0.5 μm to about 10 μm, or from about 1.0 μm to about 2.0 μm. In some embodiments, the catalyst may be an oxidized metal (e.g., rusted steel) that is reduced before or during a reaction forming solid carbon. Without being bound to any particular theory, it is believed that removal of oxides leaves voids or irregularities in the surface of the catalyst material, and increases the overall surface area of the catalyst material.

An optimum temperature of the catalytic converters 112, 302 may depend on the composition of the catalyst or on the size of the catalyst particles. Catalyst materials having small particle sizes tend to have optimum reaction temperatures at lower temperatures than the same catalyst materials with larger particle sizes. For example, the Bosch reaction may occur at temperatures in the range of approximately 400° C. to 950° C. for iron-based catalysts, depending on the particle size and composition and the desired solid carbon product. In general, graphite and amorphous solid carbon form at lower temperatures, and CNTs form at higher temperatures. CNTs may form at temperatures above about 550° C. In general, the reaction proceeds at a wide range of pressures, from near vacuum, to pressures of 4.0 MPa (580 psi) or higher. For example, CNTs may form in pressure ranges of from about 0.028 MPa (4.0 psi) to in excess of 6.2 MPa (900 psi). In some embodiments, CNTs may form at pressures from about 0.34 MPa (50 psi) to about 0.41 MPa (60 psi), or at a pressure of about 1.3 MPa (200 psi) or about 4.1 MPa (600 psi). Typically, increasing the pressure increases the reaction rate because the deposition of carbon is diffusion limited.

Small amounts of substances (e.g., sulfur) added to the catalytic converters 112, 302 (e.g., as a part of the reducing gas 110) may be catalyst promoters that accelerate the growth of carbon products on the catalysts. Such promoters may be present in a wide variety of compounds. Such a compound may be selected such that the decomposition temperature of the compound is below the temperature of the catalytic converters 112, 302. For example, if sulfur is selected as a promoter for an iron-based catalyst, the sulfur may be introduced into the catalytic converter 112 as a thiophene gas, or as thiophene droplets in a carrier gas. Examples of sulfur-containing promoters include thiophene, hydrogen sulfide, heterocyclic sulfides, and inorganic sulfides. Other promoters include lead compounds and bismuth.

Components and zones of the systems shown and described herein operate at various temperatures. For example, one or both of the catalytic converters 112, 302 may operate at a temperature of at least 450° C., such as a temperature of at least 650° C., or a temperature of from about 680° C. to about 700° C. The carbon oxide concentrator 104 or the water removal device 204 may operate at lower temperatures than the catalytic converters 112, 302. For example, the carbon oxide concentrator 104 or the water removal device 204 may operate at temperatures of less than about 100° C., less than about 80° C., or even less than about 50° C. In some embodiments, heat may be recovered from one material and transferred to another. Exemplary heat recovery systems are described in U.S. Pat. No. 4,126,000, issued Nov. 21, 1978, and titled "System for Treating and Recovering Energy from Exhaust Gases."

EXAMPLES

For Examples 1 through 7, below, carbon steel coupons were cut from a sheet of mild steel having a thickness of about 1.3 mm. Each coupon was approximately 13 mm wide and approximately 18 mm to 22 mm long. Coupons were separately placed in quartz boats about 8.5 cm long and 1.5 cm wide, and the boats were inserted end-to-end into a quartz tube having an inner diameter of about 2.54 cm and a length of about 1.2 m. The quartz tube was then placed in a tube furnace. The quartz tube was purged with hydrogen gas to reduce the surfaces of the coupons as the tube furnace was heated to operating conditions. After the tube furnace reached operating conditions, reaction gases were introduced into the quartz tube (i.e., flowed continuously through the quartz tube) such that both the upper and lower surfaces of each coupon were exposed to reaction gas. The temperatures, pressures, and gas compositions were measured or determined for each coupon. After the test, the coupons were removed from the quartz tube. Weight changes and carbon formation were noted.

Example 1

Twelve steel coupons were placed in a quartz tube as described above. A reaction gas containing about 25% $H_2$, 25% CO, 25% $CO_2$, and 25% $CH_4$ was introduced into the quartz tube at about 4.0 MPa. The gases flowed over the coupons for about 4 hours at 2000 sccm (standard cubic centimeters per minute). Solid carbon formed on eight of the twelve coupons at temperatures between about 650° C. and about 870° C., as shown in Table 1 below. After the test, solid carbon was physically removed from some of the coupons and tested for BET specific surface area, as shown in Table 1. About 41.2 grams of water was collected from the gases during the test.

TABLE 1

Solid Carbon Formation from 25% $H_2$, 25% CO, 25% $CO_2$, and 25% $CH_4$

| | Sample # | | | | | |
|---|---|---|---|---|---|---|
| | 1 | 2 | 3 | 4 | 5 | 6 |
| Distance from inlet (inches) | 5.3 | 8.6 | 12.1 | 15.9 | 19.2 | 23.3 |
| Temperature (° C.) | 358.4 | 563.3 | 649.4 | 701.5 | 721.4 | 749.9 |
| $H_2$ composition (%) | | | 23.7 | | 22.6 | 21.9 |
| $CH_4$ composition (%) | | | 24.9 | | 24.4 | 24.1 |
| $CO_2$ composition (%) | | | 23.0 | | 21.4 | 20.5 |
| CO composition (%) | | | 26.1 | | 27.2 | 27.9 |
| $H_2O$ composition (%) | | | 2.39 | | 4.46 | 5.67 |
| Deposition rate (g/cm²/hr) | 0.000 | 0.000 | 0.058 | 0.043 | 0.047 | 0.109 |
| BET Surface Area (m²/g) | | | 249.5 | 178.7 | 141.3 | |

TABLE 1-continued

Solid Carbon Formation from 25% $H_2$, 25% CO, 25% $CO_2$, and 25% $CH_4$

| | Sample # | | | | | |
|---|---|---|---|---|---|---|
| | 7 | 8 | 9 | 10 | 11 | 12 |
| Distance from inlet (inches) | 26.9 | 30.3 | 33.7 | 37.2 | 40.4 | 44.0 |
| Temperature (° C.) | 773.4 | 802.5 | 842.0 | 892.2 | 868.8 | 548.4 |
| $H_2$ composition (%) | 21.3 | 20.8 | 20.2 | | 19.2 | |
| $CH_4$ composition (%) | 23.9 | 23.6 | 23.4 | | 22.9 | |
| $CO_2$ composition (%) | 19.6 | 18.9 | 18.1 | | 16.5 | |
| CO composition (%) | 28.5 | 29.0 | 29.6 | | 30.7 | |
| $H_2O$ composition (%) | 6.71 | 7.70 | 8.71 | | 10.7 | |
| Deposition rate (g/cm²/hr) | 0.116 | 0.107 | 0.085 | 0.000 | 0.043 | 0.000 |
| BET Surface Area (m²/g) | 110.4 | 97.5 | 97.5 | | 106.4 | |

Example 2

Twelve steel coupons were placed in a quartz tube as described above. A reaction gas containing about 50% CO and 50% $CO_2$ was introduced into the quartz tube at about 4.0 MPa. The gases flowed over the coupons for about three hours at 2000 sccm. Solid carbon formed on ten of the twelve coupons at temperatures between about 590° C. and about 900° C., as shown in Table 2 below. After the test, solid carbon was physically removed from some of the coupons and tested for BET specific surface area, as shown in Table 2. No water was collected from the gases during the test.

TABLE 2

Solid Carbon Formation from 50% CO and 50% $CO_2$

| | Sample # | | | | | |
|---|---|---|---|---|---|---|
| | 1 | 2 | 3 | 4 | 5 | 6 |
| Distance from inlet (inches) | 5.5 | 9.1 | 12.4 | 16.1 | 20.1 | 23.4 |
| Temperature (° C.) | 413.9 | 589.1 | 631.2 | 666.7 | 701.1 | 738.2 |
| $H_2$ composition (%) | | 0.39 | 0.39 | 0.40 | 0.40 | 0.40 |
| $CO_2$ composition (%) | | 49.7 | 49.7 | 49.6 | 49.6 | 49.5 |
| CO composition (%) | | 49.9 | 49.9 | 50.0 | 50.0 | 50.1 |
| Deposition rate (g/cm²/hr) | 0.000 | 0.011 | 0.011 | 0.007 | 0.014 | 0.009 |
| BET Surface Area (m²/g) | | 43.9 | 78.5 | | 27.4 | |

| | Sample # | | | | | |
|---|---|---|---|---|---|---|
| | 7 | 8 | 9 | 10 | 11 | 12 |
| Distance from inlet (inches) | 26.9 | 30.4 | 33.9 | 37.1 | 40.9 | 44.3 |
| Temperature (° C.) | 785.5 | 844.2 | 897.8 | 891.0 | 825.0 | 523.5 |
| $H_2$ composition (%) | 0.40 | | 0.41 | | 0.42 | |
| $CO_2$ composition (%) | 49.5 | | 49.4 | | 49.3 | |
| CO composition (%) | 50.1 | | 50.2 | | 50.3 | |
| Deposition rate (g/cm²/hr) | 0.003 | 0.006 | 0.009 | 0.009 | 0.005 | 0.000 |
| BET Surface Area (m²/g) | | | | | | |

Example 3

Twelve steel coupons were placed in a quartz tube as described above. A reaction gas containing about 90% CO and 10% $CO_2$ was introduced into the quartz tube at about 4.0 MPa. The gases flowed over the coupons for about two hours at 2000 sccm. Solid carbon formed on ten of the twelve coupons at temperatures between about 590° C. and about 900° C., as shown in Table 3 below. After the test, solid carbon was physically removed from some of the coupons and tested for BET specific surface area, as shown in Table 3. No water was collected from the gases during the test.

TABLE 3

Solid Carbon Formation from 90% CO and 10% CO$_2$

| | Sample # | | | | | |
|---|---|---|---|---|---|---|
| | 1 | 2 | 3 | 4 | 5 | 6 |
| Distance from inlet (inches) | 5.4 | 8.9 | 12.4 | 15.9 | 20.6 | 22.9 |
| Temperature (° C.) | 423.6 | 588.5 | 632.6 | 663.1 | 703.2 | 729.4 |
| H$_2$ composition (%) | | | 0.54 | 0.57 | 0.60 | 0.62 |
| CO$_2$ composition (%) | | | 11.6 | 12.3 | 13.4 | 13.9 |
| CO composition (%) | | | 87.9 | 87.1 | 86.0 | 85.5 |
| Deposition rate (g/cm$^2$/hr) | 0.000 | 0.001 | 0.083 | 0.118 | 0.064 | 0.066 |
| BET Surface Area (m$^2$/g) | | | 68.2 | 61.7 | 58.7 | 53.2 |

| | Sample # | | | | | |
|---|---|---|---|---|---|---|
| | 7 | 8 | 9 | 10 | 11 | 12 |
| Distance from inlet (inches) | 27.1 | 30.9 | 34.8 | 36.4 | 40.6 | 44.4 |
| Temperature (° C.) | 789.4 | 857.1 | 902.4 | 898.7 | 829.0 | 499.3 |
| H$_2$ composition (%) | 0.65 | 0.68 | 0.71 | 0.72 | 0.42 | |
| CO$_2$ composition (%) | 14.9 | 15.8 | 16.7 | 18.2 | 49.3 | |
| CO composition (%) | 84.4 | 83.5 | 82.6 | 81.1 | 50.3 | |
| Deposition rate (g/cm$^2$/hr) | 0.030 | 0.019 | 0.005 | 0.005 | 0.027 | 0.000 |
| BET Surface Area (m$^2$/g) | 44.9 | | | | | |

Example 4

Twelve steel coupons were placed in a quartz tube as described above. A reaction gas containing about 90% CO and 10% CO$_2$ was introduced into the quartz tube at about 1.5 MPa. The gases flowed over the coupons for about three hours at 2000 sccm. Solid carbon formed on ten of the twelve coupons at temperatures between about 536° C. and about 890° C., as shown in Table 4 below. After the test, solid carbon was physically removed from some of the coupons and tested for BET specific surface area, as shown in Table 4. No water was collected from the gases during the test.

TABLE 4

Solid Carbon Formation from 90% CO and 10% CO$_2$

| | Sample # | | | | | |
|---|---|---|---|---|---|---|
| | 1 | 2 | 3 | 4 | 5 | 6 |
| Distance from inlet (inches) | 5.3 | 8.9 | 12.6 | 16.0 | 19.6 | 22.6 |
| Temperature (° C.) | 422.8 | 536.4 | 638.8 | 676.3 | 708.2 | 736.0 |
| H$_2$ composition (%) | | | 0.61 | 0.62 | 0.63 | 0.64 |
| CO$_2$ composition (%) | | | 9.56 | 9.75 | 9.96 | 10.1 |
| CO composition (%) | | | 89.8 | 89.6 | 89.4 | 89.2 |
| Deposition rate (g/cm$^2$/hr) | 0.000 | 0.001 | 0.011 | 0.013 | 0.013 | 0.020 |
| BET Surface Area (m$^2$/g) | | | | 53.2 | 50.4 | 44.0 |

| | Sample # | | | | | |
|---|---|---|---|---|---|---|
| | 7 | 8 | 9 | 10 | 11 | 12 |
| Distance from inlet (inches) | 26.4 | 29.8 | 32.6 | 37.2 | 40.3 | 44.0 |
| Temperature (° C.) | 768.8 | 803.1 | 831.8 | 890.5 | 856.6 | 535.6 |
| H$_2$ composition (%) | 0.65 | 0.67 | 0.68 | | | |
| CO$_2$ composition (%) | 10.3 | 10.5 | 10.7 | | | |
| CO composition (%) | 89.0 | 88.8 | 88.6 | | | |
| Deposition rate (g/cm$^2$/hr) | 0.015 | 0.009 | 0.001 | 0.001 | 0.002 | 0.000 |
| BET Surface Area (m$^2$/g) | 38.7 | 31.5 | | | | |

Example 5

Twelve steel coupons were placed in a quartz tube as described above. A reaction gas containing about 13.0% H$_2$, 15.2% CO, 10.9% CO$_2$, 57.8% CH$_4$, and 3.0% Ar was introduced into the quartz tube at about 412 kPa. The gases flowed over the coupons for about six hours at 2000 sccm. Solid carbon formed on seven of the twelve coupons at temperatures between about 464° C. and about 700° C., as shown in Table 5 below. After the test, solid carbon was physically removed from some of the coupons and tested for BET specific surface area, as shown in Table 5. About 7.95 grams of water was collected from the gases during the test.

TABLE 5

Solid Carbon Formation from 13.0% $H_2$,
15.2% CO, 10.9% $CO_2$, 57.8% $CH_4$, and 3.0% Ar

| | Sample # | | | | | |
|---|---|---|---|---|---|---|
| | 1 | 2 | 3 | 4 | 5 | 6 |
| Distance from inlet (inches) | 4.5 | 8.1 | 11.9 | 15.1 | 18.8 | 22.5 |
| Temperature (° C.) | 277.2 | 467.9 | 526.9 | 566.8 | 601.8 | 638.7 |
| $H_2$ composition (%) | | | 12.3 | | | |
| $CH_4$ composition (%) | | | 57.8 | | | |
| $CO_2$ composition (%) | | | 10.9 | | | |
| CO composition (%) | | | 15.1 | | | |
| $H_2O$ composition (%) | | | 0.87 | | | |
| Ar composition (%) | | | 3.16 | | | |
| Deposition rate (g/cm²/hr) | 0.000 | 0.000 | 0.016 | 0.019 | 0.009 | 0.007 |
| BET Surface Area (m²/g) | | | 189.5 | 245.9 | 228.9 | 142.7 |

| | Sample # | | | | | |
|---|---|---|---|---|---|---|
| | 7 | 8 | 9 | 10 | 11 | 12 |
| Distance from inlet (inches) | 26.0 | 29.6 | 33.1 | 36.8 | 40.4 | 44.1 |
| Temperature (° C.) | 666.0 | 698.1 | 737.0 | 786.3 | 766.3 | 464.4 |
| $H_2$ composition (%) | | 11.5 | | | | 10.9 |
| $CH_4$ composition (%) | | 57.5 | | | | 57.2 |
| $CO_2$ composition (%) | | 10.1 | | | | 9.39 |
| CO composition (%) | | 14.9 | | | | 14.8 |
| $H_2O$ composition (%) | | 2.85 | | | | 4.49 |
| Ar composition (%) | | 3.18 | | | | 3.20 |
| Deposition rate (g/cm²/hr) | 0.010 | 0.002 | 0.000 | 0.000 | 0.000 | 0.005 |
| BET Surface Area (m²/g) | 96.7 | 66.7 | | | | 224.8 |

Example 6

Twelve steel coupons were placed in a quartz tube as described above. A reaction gas containing about 13.0% $H_2$, 15.2% CO, 13.0% $CO_2$, 55.8% $CH_4$, and 2.93% Ar was introduced into the quartz tube at about 412 kPa. The gases flowed over the coupons for about six hours at 2000 sccm. Solid carbon formed on seven of the twelve coupons at temperatures between about 536° C. and about 794° C., as shown in Table 6 below. After the test, solid carbon was physically removed from some of the coupons and tested for BET specific surface area, as shown in Table 6. About 7.38 grams of water was collected from the gases during the test.

TABLE 6

Solid Carbon Formation from 13.0% $H_2$,
15.2% CO, 13.0% $CO_2$, 55.8% $CH_4$, and 2.93% Ar

| | Sample # | | | | | |
|---|---|---|---|---|---|---|
| | 1 | 2 | 3 | 4 | 5 | 6 |
| Distance from inlet (inches) | 5.4 | 9.0 | 12.4 | 15.6 | 19.1 | 23.3 |
| Temperature (° C.) | 335.8 | 482.4 | 536.9 | 574.6 | 607.4 | 645.4 |
| $H_2$ composition (%) | | | | 11.5 | 11.3 | 11.1 |
| $CH_4$ composition (%) | | | | 55.7 | 55.6 | 55.5 |
| $CO_2$ composition (%) | | | | 13.3 | 13.1 | 13.0 |
| CO composition (%) | | | | 15.2 | 15.3 | 15.4 |
| $H_2O$ composition (%) | | | | 1.24 | 1.62 | 2.07 |
| Ar composition (%) | | | | 3.04 | 3.06 | 3.07 |
| Deposition rate (g/cm²/hr) | 0.000 | 0.000 | 0.015 | 0.009 | 0.007 | 0.007 |
| BET Surface Area (m²/g) | | | 225.8 | 251.1 | 189.8 | 132.7 |

| | Sample # | | | | | |
|---|---|---|---|---|---|---|
| | 7 | 8 | 9 | 10 | 11 | 12 |
| Distance from inlet (inches) | 27.0 | 30.4 | 33.8 | 37.5 | 40.8 | 44.5 |
| Temperature (° C.) | 673.4 | 704.6 | 744.3 | 794.1 | 752.9 | 438.7 |
| $H_2$ composition (%) | 10.8 | 10.6 | | | | |
| $CH_4$ composition (%) | 55.3 | 55.2 | | | | |
| $CO_2$ composition (%) | 12.8 | 12.7 | | | | |
| CO composition (%) | 15.5 | 15.6 | | | | |
| $H_2O$ composition (%) | 2.5 | 2.86 | | | | |
| Ar composition (%) | 3.08 | 3.10 | | | | |
| Deposition rate (g/cm²/hr) | 0.004 | 0.0003 | 0.000 | 0.0001 | 0.0001 | 0.0001 |
| BET Surface Area (m²/g) | 79.4 | | | | | |

Example 7

Twelve steel coupons were placed in a quartz tube as described above. A reaction gas containing about 15.2% $H_2$, 13.0% CO, 8.7% $CO_2$, 59.9% $CH_4$, and 3.15% Ar was introduced into the quartz tube at about 412 kPa. The gases flowed over the coupons for about six hours at 2000 sccm. Solid carbon formed on ten of the twelve coupons at temperatures between about 523° C. and about 789° C., as shown in Table 7 below. After the test, solid carbon was physically removed from some of the coupons and tested for BET specific surface area, as shown in Table 7. About 9.59 grams of water was collected from the gases during the test.

TABLE 7

Solid Carbon Formation from 15.2% $H_2$, 13.0% CO, 8.7% $CO_2$, 59.9% $CH_4$, and 3.15% Ar

| | Sample # | | | | | |
|---|---|---|---|---|---|---|
| | 1 | 2 | 3 | 4 | 5 | 6 |
| Distance from inlet (inches) | 4.4 | 7.9 | 11.9 | 15.4 | 18.9 | 22.4 |
| Temperature (° C.) | 262.5 | 466.7 | 523.6 | 568.8 | 603.8 | 638.1 |
| $H_2$ composition (%) | | | | 13.8 | 13.6 | 13.4 |
| $CH_4$ composition (%) | | | | 59.9 | 59.9 | 59.9 |
| $CO_2$ composition (%) | | | | 9.36 | 9.21 | 9.07 |
| CO composition (%) | | | | 13.0 | 13.0 | 13.1 |
| $H_2O$ composition (%) | | | | 0.90 | 1.17 | 1.45 |
| Ar composition (%) | | | | 3.15 | 3.15 | 3.16 |
| Deposition rate (g/cm$^2$/hr) | 0.000 | 0.000 | 0.005 | 0.024 | 0.012 | 0.015 |
| BET Surface Area (m$^2$/g) | | | 149.1 | 233.6 | 209.7 | 128.0 |

| | Sample # | | | | | |
|---|---|---|---|---|---|---|
| | 7 | 8 | 9 | 10 | 11 | 12 |
| Distance from inlet (inches) | 25.8 | 29.4 | 33.3 | 36.5 | 40.1 | 43.6 |
| Temperature (° C.) | 664.0 | 695.1 | 736.5 | 781.3 | 788.8 | 553.2 |
| $H_2$ composition (%) | 13.2 | 13.1 | 12.9 | | | |
| $CH_4$ composition (%) | 59.9 | 59.8 | 59.8 | | | |
| $CO_2$ composition (%) | 8.93 | 8.78 | 8.62 | | | |
| CO composition (%) | 13.1 | 13.2 | 13.2 | | | |
| $H_2O$ composition (%) | 1.72 | 2.01 | 2.32 | | | |
| Ar composition (%) | 3.16 | 3.16 | 3.17 | | | |
| Deposition rate (g/cm$^2$/hr) | 0.013 | 0.001 | 0.0002 | 0.00006 | 0.0001 | 0.008 |
| BET Surface Area (m$^2$/g) | 76.9 | 77.3 | | | | 251.5 |

Prophetic Example 8

Methane gas is mixed with carbon dioxide gas in a ratio of 1.2:1 inside a first tube furnace lined with a ceramic material, maintained at about 680° C., and containing steel wool therein. The methane gas reacts with the carbon dioxide gas in the presence of the steel wool to form single-wall carbon nanotubes and a residual gas mixture of carbon dioxide, carbon monoxide, methane, water, and hydrogen. The residual gas mixture enters a condenser operating at about 50° C. to remove liquid water from the residual gas mixture. The dried residual gas mixture enters a second tube furnace lined with a ceramic material, maintained at about 680° C., and containing steel wool therein. The carbon dioxide, carbon monoxide, methane, and hydrogen in the dried reaction gas mixture react in the presence of the steel wool to form single-wall carbon nanotubes and a tail gas mixture of water, methane, and hydrogen. The carbon nanotubes collect on surfaces of the steel wool. The tail gas mixture enters is recycled to the pre-concentrator.

After the process has proceeded for a period of time, flow of gas is stopped, the furnaces and condenser are cooled to room temperature, and the system is purged with an inert gas. The steel wool is removed from the second tube furnace, and the carbon nanotubes are physically removed from the steel wool. Any remaining metal on the carbon nanotubes is removed by washing with acid.

Prophetic Example 9

Ethane gas is mixed with carbon dioxide gas in a ratio of 1:1 inside a first tube furnace lined with a ceramic material, maintained at about 680° C., and containing steel wool therein. The ethane gas reacts with the carbon dioxide gas in the presence of the steel wool to form single-wall carbon nanotubes and a residual gas mixture of carbon dioxide, carbon monoxide, ethane, methane, water, and hydrogen. The residual gas mixture enters a condenser operating at about 50° C. to remove liquid water from the residual gas mixture. The dried residual gas mixture enters a second tube furnace lined with a ceramic material, maintained at about 680° C., and containing steel wool therein. The carbon dioxide, carbon monoxide, ethane, methane, and hydrogen in the dried reaction gas mixture react in the presence of the steel wool to form single-wall carbon nanotubes and a tail gas mixture of water, ethane, methane, and hydrogen. The carbon nanotubes collect on surfaces of the steel wool. The tail gas mixture enters is recycled to the pre-concentrator.

After the process has proceeded for a period of time, flow of gas is stopped, the furnaces and condenser are cooled to room temperature, and the system is purged with an inert gas. The steel wool is removed from the second tube furnace, and the carbon nanotubes are physically removed from the steel wool. Any remaining metal on the carbon nanotubes is removed by washing with acid.

Prophetic Example 10

Hydrogen gas is mixed with carbon dioxide gas in a ratio of about 2.1:1 inside a first tube furnace lined with a ceramic material, maintained at about 680° C., and containing steel wool therein. The hydrogen gas reacts with the carbon dioxide gas in the presence of the steel wool to form single-wall carbon nanotubes and a residual gas mixture of carbon dioxide, carbon monoxide, water, and hydrogen. The residual gas mixture enters a condenser operating at about 50° C. to remove liquid water from the residual gas mixture. The dried residual gas mixture enters a second tube furnace lined with a ceramic material, maintained at about 680° C., and containing steel wool therein. The carbon dioxide, carbon monoxide, and hydrogen in the dried reaction gas mixture react in the presence of the steel wool to form single-wall carbon nanotubes and a tail gas mixture of water and hydrogen. The carbon nanotubes collect on surfaces of the steel wool. The tail gas mixture enters is recycled to the pre-concentrator.

After the process has proceeded for a period of time, flow of gas is stopped, the furnaces and condenser are cooled to room temperature, and the system is purged with an inert gas. The steel wool is removed from the second tube furnace, and the carbon nanotubes are physically removed from the steel wool. Any remaining metal on the carbon nanotubes is removed by washing with acid.

The disclosure has several advantages over conventional methods. Although embodiments of the methods have been described, various modifications and changes may be made by those skilled in the art without departing from the spirit and scope of the disclosure.

What is claimed is:

1. A method of capturing and sequestering carbon from a carbon-oxide-containing gas stream, comprising:
    passing a reaction gas stream comprising at least one carbon oxide and at least one reducing agent through a first catalytic converter in the presence of a catalyst to convert at least a portion of the at least one carbon oxide and at least a portion of the at least one reducing agent to solid carbon and an intermediate gas stream comprising water vapor;
    removing the first solid carbon product from the first catalytic converter;
    removing water from the intermediate gas stream to form a dried intermediate gas stream;
    passing the dried intermediate gas stream through a second catalytic converter to form a second solid carbon product and a tail gas stream;
    removing the second solid carbon product from the second catalytic converter; and
    recycling at least a portion of the tail gas stream to the first catalytic converter, the recycling comprising:
        passing the tail gas stream to a carbon oxide concentrator without removing water from the tail gas stream;
        removing at least a portion of the water and at least a portion of a gas other than a carbon oxide from the tail gas stream in the carbon oxide concentrator to form a dry recycle gas stream; and
        mixing at least a portion of the dry recycle gas stream with the reaction gas stream.

2. The method of claim 1, wherein recycling at least a portion of the tail gas stream to the first catalytic converter comprises recycling the tail gas stream at a pressure sufficient to cause condensation of at least a portion of the water vapor produced in the second catalytic converter without the use of mechanical refrigeration.

3. The method of claim 1, wherein recycling at least a portion of the tail gas stream to the first catalytic converter comprises passing the tail gas stream through a carbon oxide concentrator.

4. The method of claim 1, wherein the tail gas stream further comprises an unreacted portion of the reaction gas stream.

5. The method of claim 1, further comprising selecting the reaction gas stream to include a reducing gas comprising hydrogen, an alkane, and alcohol, or a mixture thereof.

6. The method of claim 1, further comprising selecting the reaction gas stream to comprise a carbon oxide comprising primarily carbon dioxide.

7. The method of claim 1, wherein passing the reaction gas stream comprising at least one carbon oxide and at least one reducing agent through a first catalytic converter in the presence of a catalyst comprises introducing the reaction gas stream at a pressure sufficient to cause the reaction gas stream to flow through the catalytic converter without further input of mechanical or electrical energy.

8. The method of claim 1, wherein removing water from the intermediate gas stream comprises condensing water from the intermediate gas stream to produce a dried intermediate gas stream having a dew point of less than about 0° C.

9. The method of claim 1, wherein passing a reaction gas stream comprising at least one carbon oxide and at least one reducing agent through a first catalytic converter in the presence of a catalyst comprises contacting the reaction gas stream with a reaction catalyst for the Bosch reaction at a temperature above about 400° C.

10. The method of claim 1, wherein passing a reaction gas stream comprising at least one carbon oxide and at least one reducing agent through a first catalytic converter in the presence of a catalyst comprises forming at least one material selected from the group consisting of graphite, graphene, carbon black, soot, fibrous carbon, buckminsterfullerenes, carbon nanotubes, carbon platelets, and nanodiamond.

11. The method of claim 1, further comprising separating at least a portion of the reaction gas stream from a dilute effluent source by concentrating the dilute effluent source to increase a concentration of the at least one carbon oxide.

12. The method of claim 11, wherein concentrating the dilute effluent source comprises forming the reaction gas stream comprising at least one of inert gases and hydrocarbons.

13. The method of claim 1, wherein passing a reaction gas stream comprising at least one carbon oxide and at least one reducing agent through a first catalytic converter in the presence of a catalyst comprises exposing the reaction gas stream to a catalyst selected from the group consisting of elements of Groups 5 through 10 in the periodic table of elements, lanthanides, actinides, metal alloys of such elements, and combinations thereof.

14. The method of claim 13, wherein the catalyst comprises at least one material selected from the group consisting of Zn, Fe, Ni, W, V, Cr, Sn, Cu, Co, Mn, and Mo.

15. The method of claim 1, wherein the catalyst comprises at least one material selected from the group consisting of steel, cast iron, and white cast iron.

16. The method of claim 1, wherein the catalyst comprises at least some particles selected from the group consisting of shot, grit, and powder.

17. The method of claim 1, wherein the catalyst comprises at least one material selected from the group consisting of a plate, a sheet, and a foil.

18. The method of claim 1, wherein the catalyst comprises fibers.

19. The method of claim 18, wherein the catalyst comprises at least one material selected from the group consisting of steel wool and chopped steel wool.

* * * * *

UNITED STATES PATENT AND TRADEMARK OFFICE
CERTIFICATE OF CORRECTION

PATENT NO. : 9,221,685 B2  
APPLICATION NO. : 14/389715  
DATED : December 29, 2015  
INVENTOR(S) : Dallas B. Noyes Page 1 of 1

It is certified that error appears in the above-identified patent and that said Letters Patent is hereby corrected as shown below:

In the specification:

COLUMN 12, LINE 1, change "200, 0.300" to --200, 300--

Signed and Sealed this
Fifth Day of July, 2016

Michelle K. Lee
*Director of the United States Patent and Trademark Office*